United States Patent
Chakraborty et al.

(10) Patent No.: US 12,216,436 B2
(45) Date of Patent: Feb. 4, 2025

(54) SYSTEMS AND METHODS FOR DETERMINING OPERATIONS OF A SMART FIXTURE

(71) Applicant: Zurn Industries, LLC, Milwaukee, WI (US)

(72) Inventors: Arindam Chakraborty, Milwaukee, WI (US); Kevin Brockman, Milwaukee, WI (US)

(73) Assignee: ZURN WATER, LLC, Milwaukee, WI (US)

( * ) Notice: Subject to any disclaimer, the term of this patent is extended or adjusted under 35 U.S.C. 154(b) by 0 days.

(21) Appl. No.: 18/469,841

(22) Filed: Sep. 19, 2023

(65) Prior Publication Data
US 2024/0077839 A1 Mar. 7, 2024

Related U.S. Application Data

(63) Continuation of application No. 18/147,661, filed on Dec. 28, 2022, now Pat. No. 11,803,166, which is a
(Continued)

(51) Int. Cl.
*G05B 13/02* (2006.01)
*G06Q 10/20* (2023.01)
(Continued)

(52) U.S. Cl.
CPC ....... *G05B 13/0265* (2013.01); *G06Q 50/163* (2013.01); *H04L 12/2803* (2013.01); *G06Q 10/20* (2013.01)

(58) Field of Classification Search
None
See application file for complete search history.

(56) References Cited

U.S. PATENT DOCUMENTS

| 4,563,780 A | 1/1986 | Pollack |
| 4,805,247 A | 2/1989 | Laverty, Jr. |

(Continued)

FOREIGN PATENT DOCUMENTS

| CA | 2942987 A1 | 9/2015 | |
| CN | 203217337 U * | 9/2013 | ........... G05B 19/418 |

(Continued)

OTHER PUBLICATIONS

Huang, et al., "Development of an Intelligent Energy Management Network for Building Automation," Feb. 2003, IEEE Transactions on Automation Science and Engineering, vol. 1, No. 1, Jul. 2004 (12 pages).

(Continued)

*Primary Examiner* — Mohammad Ali
*Assistant Examiner* — Kelvin Booker
(74) *Attorney, Agent, or Firm* — Husch Blackwell LLP

(57) ABSTRACT

A fixture that includes an electro-mechanical (EM) element; a communication interface; a processor; and a computer-readable storage media coupled to the processor and having instructions stored thereon which, when executed by the processor, cause the processor to perform operations comprising: receiving, from a service via the communication interface, parameters for scheduling an operation of the fixture; determining, based on the parameters, a plurality of commands for the EM element and a respective time to execute each of the commands; providing, at the respective time, each of the commands to the respective EM element for execution; providing, via the communication interface, an indication of completion of the operation of the fixture to the service.

20 Claims, 13 Drawing Sheets

Related U.S. Application Data continuation of application No. 17/466,496, filed on Sep. 3, 2021, now Pat. No. 11,573,539.

(51) Int. Cl.
*G06Q 50/16* (2024.01)
*G06Q 50/163* (2024.01)
*H04L 12/28* (2006.01)

(56) References Cited

U.S. PATENT DOCUMENTS

| | | | |
|---|---|---|---|
| 5,217,035 A | 6/1993 | Van Marcke | |
| 5,438,714 A | 8/1995 | Shaw | |
| 5,612,890 A | 3/1997 | Strasser et al. | |
| 5,844,808 A | 12/1998 | Konsmo et al. | |
| 6,018,827 A | 2/2000 | Shaw et al. | |
| 6,038,519 A | 3/2000 | Gauthier et al. | |
| 6,189,163 B1 | 2/2001 | Van Marcke | |
| 6,236,953 B1 | 5/2001 | Segal | |
| 6,250,601 B1 * | 6/2001 | Kolar | G01S 7/41 |
| | | | 251/129.04 |
| 6,337,635 B1 | 1/2002 | Ericksen et al. | |
| 6,347,414 B2 | 2/2002 | Contadini et al. | |
| 6,411,920 B1 | 6/2002 | McConnell et al. | |
| 6,583,720 B1 | 6/2003 | Quigley | |
| 6,694,177 B2 | 2/2004 | Eggers et al. | |
| 6,749,122 B1 | 6/2004 | Koenck et al. | |
| 6,766,221 B1 | 7/2004 | Christiansen | |
| 6,769,443 B2 | 8/2004 | Bush | |
| 6,956,498 B1 | 10/2005 | Gauthier et al. | |
| 7,562,380 B2 | 7/2009 | Negishi et al. | |
| 8,364,546 B2 * | 1/2013 | Yenni | H04L 67/12 |
| | | | 702/56 |
| 9,060,295 B2 | 6/2015 | Edara et al. | |
| 9,476,188 B2 | 10/2016 | Peel | |
| 9,501,613 B1 | 11/2016 | Hanson et al. | |
| 9,594,366 B2 | 3/2017 | Klein et al. | |
| 9,618,911 B2 | 4/2017 | Bodnar | |
| 9,783,964 B2 | 10/2017 | Thompson et al. | |
| 9,817,383 B1 | 11/2017 | Sinha et al. | |
| 9,945,103 B2 | 4/2018 | Thompson et al. | |
| 10,047,974 B1 | 8/2018 | Riblet et al. | |
| 10,098,201 B1 | 10/2018 | Wilson et al. | |
| 10,110,679 B2 | 10/2018 | Chandhoke et al. | |
| 10,200,474 B2 | 2/2019 | Zhang et al. | |
| 10,301,799 B2 | 5/2019 | Thompson et al. | |
| 10,303,509 B2 | 5/2019 | Qiao et al. | |
| 10,323,393 B2 | 6/2019 | Thompson et al. | |
| 10,323,860 B1 | 6/2019 | Riblet et al. | |
| 10,361,802 B1 | 7/2019 | Hoffberg-Borghesani et al. | |
| 10,378,676 B2 * | 8/2019 | Bush | F16K 31/0675 |
| 10,411,984 B2 | 9/2019 | Hoglund | |
| 10,474,613 B1 | 11/2019 | Dunn et al. | |
| 10,480,825 B1 | 11/2019 | Riblet et al. | |
| 10,520,210 B2 | 12/2019 | Park et al. | |
| 10,673,645 B2 | 6/2020 | Ansari et al. | |
| 10,674,428 B2 | 6/2020 | Cohn et al. | |
| 10,724,756 B2 | 7/2020 | Gavin et al. | |
| 10,823,440 B2 | 11/2020 | Gillette et al. | |
| 10,823,458 B1 | 11/2020 | Riblet et al. | |
| 10,945,109 B2 | 3/2021 | Nies et al. | |
| 11,076,015 B2 | 7/2021 | Isberg et al. | |
| 11,108,865 B1 | 8/2021 | Chakraborty et al. | |
| 11,221,601 B1 | 1/2022 | Chakraborty et al. | |
| 11,316,908 B1 | 4/2022 | Chakraborty et al. | |
| 11,445,024 B2 | 9/2022 | Turney et al. | |
| 11,449,015 B2 | 9/2022 | Locke et al. | |
| 11,514,679 B1 * | 11/2022 | Feil | G06T 7/70 |
| 11,543,791 B1 * | 1/2023 | Troutman | G08B 25/14 |
| 2002/0099454 A1 | 7/2002 | Gerrity | |
| 2009/0119142 A1 * | 5/2009 | Yenni | H04L 67/12 |
| | | | 705/7.15 |
| 2010/0324962 A1 | 12/2010 | Nesler et al. | |
| 2013/0253723 A1 | 9/2013 | Oh et al. | |
| 2016/0063854 A1 | 3/2016 | Burton et al. | |
| 2016/0091872 A1 | 3/2016 | Marti et al. | |
| 2016/0239001 A1 | 8/2016 | Chin et al. | |
| 2016/0335731 A1 | 11/2016 | Hall | |
| 2017/0053210 A1 | 2/2017 | Duong | |
| 2017/0167123 A1 * | 6/2017 | Allard, III | E03C 1/057 |
| 2017/0168508 A1 * | 6/2017 | Bush | F16K 37/0091 |
| 2017/0284691 A1 | 10/2017 | Sinha et al. | |
| 2017/0322534 A1 * | 11/2017 | Sinha | G06Q 50/163 |
| 2017/0329292 A1 | 11/2017 | Piaskowski et al. | |
| 2017/0357224 A1 | 12/2017 | Berrien | |
| 2017/0370987 A1 * | 12/2017 | Lussier | H01R 43/18 |
| 2018/0024520 A1 * | 1/2018 | Sinha | G05B 13/0265 |
| | | | 700/275 |
| 2018/0046173 A1 | 2/2018 | Ahmed | |
| 2018/0067635 A1 | 3/2018 | Zummo | |
| 2018/0076978 A1 | 3/2018 | Schubert et al. | |
| 2018/0101158 A1 * | 4/2018 | Guthrie | G05B 15/02 |
| 2018/0102954 A1 * | 4/2018 | Schubert | H04L 12/28 |
| 2018/0102958 A1 * | 4/2018 | Guthrie | G06Q 10/10 |
| 2018/0119975 A1 | 5/2018 | Park et al. | |
| 2018/0164993 A1 | 6/2018 | Zummo et al. | |
| 2018/0224819 A1 | 8/2018 | Noboa | |
| 2018/0232031 A1 | 8/2018 | Swierk et al. | |
| 2018/0232422 A1 | 8/2018 | Park et al. | |
| 2018/0234266 A1 | 8/2018 | Rudolph et al. | |
| 2018/0234318 A1 | 8/2018 | Cox et al. | |
| 2018/0234326 A1 | 8/2018 | Swierk et al. | |
| 2018/0234489 A1 | 8/2018 | Hammons et al. | |
| 2018/0234519 A1 | 8/2018 | Boyapalle et al. | |
| 2018/0238577 A1 | 8/2018 | Trikha et al. | |
| 2018/0253569 A1 | 9/2018 | Swierk et al. | |
| 2018/0275625 A1 | 9/2018 | Park et al. | |
| 2018/0293864 A1 | 10/2018 | Wedig et al. | |
| 2018/0299840 A1 * | 10/2018 | Sinha | G05B 13/0265 |
| 2018/0313561 A1 | 11/2018 | Sinha et al. | |
| 2018/0313564 A1 | 11/2018 | Gavin et al. | |
| 2018/0341234 A1 | 11/2018 | Piaskowski et al. | |
| 2018/0347843 A1 | 12/2018 | Friedenberger et al. | |
| 2018/0364654 A1 | 12/2018 | Locke et al. | |
| 2019/0041829 A1 | 2/2019 | Sinha et al. | |
| 2019/0095519 A1 | 3/2019 | Park et al. | |
| 2019/0149618 A1 | 5/2019 | Tsai et al. | |
| 2019/0162438 A1 | 5/2019 | Fokou et al. | |
| 2019/0271978 A1 * | 9/2019 | ElBsat et al. | G06Q 30/0282 |
| 2019/0295034 A1 * | 9/2019 | Wenzel | G06Q 10/0875 |
| 2019/0347622 A1 * | 11/2019 | Elbsat | G05B 23/0283 |
| 2019/0361411 A1 | 11/2019 | Park et al. | |
| 2019/0377305 A1 | 12/2019 | Petrus et al. | |
| 2020/0050753 A1 | 2/2020 | Davis et al. | |
| 2020/0090289 A1 | 3/2020 | Elbsat et al. | |
| 2020/0096985 A1 | 3/2020 | Wenzel et al. | |
| 2020/0113015 A1 | 4/2020 | Basu Mallick et al. | |
| 2020/0128566 A1 | 4/2020 | Wei et al. | |
| 2020/0294128 A1 * | 9/2020 | Cella | H04L 9/3239 |
| 2020/0301408 A1 | 9/2020 | Elbsat et al. | |
| 2020/0309399 A1 | 10/2020 | Coakley | |
| 2020/0313925 A1 | 10/2020 | Singh et al. | |
| 2020/0356087 A1 * | 11/2020 | Elbsat | G05B 23/0254 |
| 2020/0399873 A1 | 12/2020 | Chakraborty et al. | |
| 2020/0409883 A1 | 12/2020 | Dixit et al. | |
| 2021/0018205 A1 | 1/2021 | Ellis et al. | |
| 2021/0018210 A1 | 1/2021 | Nasis | |
| 2021/0140159 A1 | 5/2021 | Desermia | |
| 2021/0144210 A1 | 5/2021 | Kolhapure et al. | |
| 2021/0157340 A1 * | 5/2021 | Heydari | G05B 15/02 |
| 2021/0158975 A1 | 5/2021 | Turney et al. | |
| 2021/0176319 A1 | 6/2021 | Leannah et al. | |
| 2021/0182228 A1 | 6/2021 | Dixit et al. | |
| 2021/0192469 A1 * | 6/2021 | Turney | G05B 23/0237 |
| 2021/0200164 A1 | 7/2021 | Ploegert et al. | |
| 2021/0208611 A1 | 7/2021 | Trikha et al. | |
| 2021/0262689 A1 * | 8/2021 | Shinde | F24F 11/38 |
| 2021/0383658 A1 | 12/2021 | Chakraborty et al. | |

(56) References Cited

U.S. PATENT DOCUMENTS

2021/0389968 A1   12/2021   Majewski et al.
2022/0247794 A1   8/2022   Chakraborty et al.

FOREIGN PATENT DOCUMENTS

| | | | | |
|---|---|---|---|---|
| CN | 105182759 A | * | 12/2015 | ............ G05B 15/02 |
| CN | 204925661 U | * | 12/2015 | ............ G05B 15/02 |
| CN | 105549504 A | * | 5/2016 | ........... G07C 9/0090 |
| CN | 205405152 U | * | 7/2016 | ........... G05B 19/042 |
| CN | 106200537 A | * | 12/2016 | ........... G05B 19/048 |
| CN | 107203145 A | * | 9/2017 | ............ G05B 15/02 |
| CN | 109711804 A | * | 5/2019 | ............ G06Q 10/10 |
| CN | 208956213 U | * | 6/2019 | ............... H04N 7/18 |
| CN | 212211063 U | * | 12/2020 | ............ H04L 29/08 |
| CN | 112882395 A | * | 6/2021 | ........... G05B 19/418 |
| EP | 2937478 A1 | | 10/2015 | |
| EP | 2937760 A1 | | 10/2015 | |
| EP | 3835495 A2 | | 6/2021 | |
| EP | 2937478 B1 | | 3/2024 | |
| GB | 2502165 B | | 11/2014 | |
| JP | 2002021149 A | | 1/2002 | |
| KR | 1020020033927 A | | 5/2002 | |
| KR | 1020050081019 A | | 8/2005 | |
| KR | 100780601 B1 | * | 11/2007 | ............ G06Q 50/10 |
| KR | 101673576 B1 | * | 11/2016 | ............ G06Q 50/10 |
| KR | 101722458 B1 | | 4/2017 | |
| NL | 2017516 B1 | | 3/2018 | |
| WO | 2018056815 A1 | | 3/2018 | |
| WO | 2019060295 A1 | | 3/2019 | |
| WO | 2021026370 A1 | | 2/2021 | |

OTHER PUBLICATIONS

Kastner, et al., "Communication Systems for Building Automation and Control," Jan. 2005, Proceedings of the IEEE, vol. 93, No. 6, Jun. 2005.

Base Line, FMLink website: https://www.fmlink.com/articles/baseline-lawn-irrigation-systembacnet/, Aug. 31, 2018, (3 Pages).

Tang, et al., "A review of building information modeling (BIM) and the internet of things {IoT} devices integration: Present status and future trends," Jun. 2018, Automation in Construction 101 (2019) {pp. 127-139).

Badger Meter, Utility Water & Wastewater Solutions/Commercial & Industrial measurement Solutions, website: https://www.badgermeter.com/en-GB, Copyright 2020, (6 Pages).

Comptech, Metering Solutions for Energy Suppliers, website: https://www.multical.hu/BACnet_modul_datasheet.pdf, Copyright 2020, (1 Page).

Base Line, BACnet Manager, Brochure, website: https://www.baselinesystems.com/mediafiles//pdf/BACnet_B_Brochure_Web.pdf, Publicly available at least as early as Feb. 1, 2021, (2 Pages).

Wikipedia, Building Management System, website: https://en.wikipedia.org/wiki/Building_management_system, Publicly available at least as early as Feb. 1, 2021, but page last edited Mar. 12, 2021, (2 Pages).

* cited by examiner

SYSTEMS AND METHODS FOR DETERMINING OPERATIONS OF A SMART FIXTURE

BACKGROUND

*Legionella pneumophila* is a gram-negative bacterium usually found in small amounts in water in both nature and built environments. In larger amounts, the bacterium can be responsible for a severe pneumonia known as Legionnaires' disease. Transmission of *Legionella pneumophila* typically occurs when a person inhales contaminated aerosols from, for example, showers, cooling towers, faucets, fountains, flushing toilets, and the like.

SUMMARY

In the field of facility or building management, there is a desire to manage the performance of an Internet of Things (IoT) architecture of fixtures. Examples of such IoT enabled fixtures include faucets, flush valves, hand dryers, floor drains, air or room quality sensors, backflow preventers, bottle fillers, pressure sensors, leak detection sensors, occupancy detection sensors, resource dispensers (e.g., a soap dispenser, a sanitizer dispenser, a room deodorizer dispenser, a paper tower dispenser), and the like.

Accordingly, embodiments of the present disclosure are generally directed to systems for management of IoT enabled fixtures. More particularly, embodiments of the present disclosure are directed to fixture management systems that integrate with building management solutions (BMS) (e.g., building automation and control network (BACnet) servers, computing devices, and the like) and are employed to, for example, collect fixture usage data, determine predictive maintenance, provide alerts, and provide commands in real-time to the network of integrated IoT enabled fixtures. Embodiments described herein include an IoT architecture of fixtures that communicate via endpoint devices and facility gateways with a cloud network (e.g., a cloud server). In some embodiments, the cloud network transmits the fixture data to a BACnet gateway device (e.g., through Long Range (LoRa) wide area network (WAN) radio frequency (RF) communication protocols). In some embodiments, the BACnet gateway device converts the fixture data, which is provided for display on a BACnet dashboard.

For example, a building manager may monitor water usage or consumption for one or more restroom facilities within the building. The monitored data may indicate, for example, a certain percentage of life remaining for a flush valve (or a component of the flush valve) determined based on a rated life of flushes or the number of flush operations performed by the flush valve. In some embodiments, the described fixture management system generates alerts determined based on the monitored data. For example, an alert may be generated indicating that an expected life remaining for the flush valve has reach a particular threshold. Other example alerts include mundane events such as a low soap alert to more urgent events such as a backflow discharge is in progress alert, or a drain is clogged.

In some embodiments, commands (e.g., instructions) that are issued by users via a user interface are provided to the various fixtures that make the IoT architecture in real-time. For example, a user may be assigned to control a fixture(s) or water management system in multiple buildings and floors. In some embodiments, the user issues commands to the various controlled fixtures and systems via a user interface. In some embodiments, the user may assign controlled fixtures to one or more groups and issue group wide commands, which are executed by each fixture assigned to the respective group. For example, an issue command may instruct a fixture to turn on or off at a selected (e.g., prescheduled) time-interval.

In one aspect, disclosed herein, are fixtures comprising: an electro-mechanical (EM) element; a communication interface; a processor; and a computer-readable storage media coupled to the processor and having instructions stored thereon which, when executed by the processor, cause the processor to perform operations comprising: receiving, from a service via the communication interface, parameters for scheduling an operation of the fixture; determining, based on the parameters, a plurality of commands for the EM element and a respective time to execute each of the commands; providing, at the respective time, each of the commands to the respective EM element for execution; providing, via the communication interface, an indication of completion of the operation of the fixture to the service. In some embodiments, the fixture is associated with a facility. In some embodiments, the operations further comprise providing, to the service via the communication interface, fixture data determined according to an employment of the EM element. In some embodiments, the operation of the fixture is determined by processing the fixture data through a model trained with data received from the fixture and other fixtures associated with the facility. In some embodiments, the operation of the fixture is determined based on an input from a user interface. In some embodiments, the operation of the fixture is provided to a group of fixtures. In some embodiments, the fixture is assigned to the group of fixtures. In some embodiments, the processor and the computer-readable storage media comprise an end point device that is separate from the fixture and communicably coupled to the fixture via a second communication interface. In some embodiments, the EM element comprises a water valve. In some embodiments, the operation of the fixture comprises a purge operation. In some embodiments, the parameters comprise a start time and a length of time for execution. In some embodiments, the commands comprise an on command for the water value and an off command for the water valve. In some embodiments, the on command is provide to the water value at the start time. In some embodiments, the off command is provided to the water valve the length of time for execution after the start time. In some embodiments, the fixture comprises a thermal mixing valve, a fire protection device, a drain, a contamination monitor, an air quality monitor, a door handle, or a waste receptacle. In some embodiments, the service is provided by a BMS. In some embodiments, the parameters comprise a current time. In some embodiments, the operations further comprise synchronizing an internal RTC based on the current time. In some embodiments, each of the commands is provided at the respective time based on the internal RTC. In some embodiments, the operations further comprise providing, to the service via the communication interface, an error condition when the EM element fails to execute the provided command. In some embodiments, the operations further comprise providing, via the communications interface, a request for current operations to the service when a connection to a network is reestablished.

In another aspect, disclosed herein, are methods for determining a maintenance operation for a fixture. These the methods comprise: receiving, from a fixture associated with a facility, fixture data related to an operation of at least one EM element of the fixture; processing the fixture data through a fixture maintenance model to determine a maintenance operation for the fixture, the fixture operations model trained with fixture data previously received from the fixture and other fixtures associated with the facility; determining a plurality of parameters based on the maintenance operation and fixture data previously received from the fixture; and providing the maintenance operation and associated parameters to the fixture. In some embodiments, the fixture operation determining systems further comprise a user-interface. In some embodiments, the operations further comprise: providing the maintenance operation and associated parameters to the user-interface instead of the fixture; receiving, from the user-interface, a selection of maintenance operations for the fixture; and providing the selection of maintenance operations and associated parameters to the fixture. In some embodiments, the at least one EM element comprises an actuator or a sensor. In some embodiments, the operations further comprise providing the maintenance operation and associated parameters to a group of fixtures associated with the fixture. In some embodiments, the operations further comprise providing the maintenance operation and associated parameters to an endpoint device associated with the fixture instead of directly to the fixture. In some embodiments, the EM element comprises a water valve. In some embodiments, the maintenance operation comprises a purge operation. In some embodiments, the parameters comprise a start time and a length of execution. In some embodiments, the fixture comprises a thermal mixing valve, a fire protection device, a drain, a contamination monitor, an air quality monitor, a door handle, or a waste receptacle.

In another aspect, disclosed herein, fixture operation determining systems. These systems comprise: a processor; and a computer-readable storage device coupled to the processor and having instructions stored thereon which, when executed by the processor, cause the processor to perform operations comprising: receiving, from a fixture associated with a facility, fixture data related to an operation of at least one EM element of the fixture; processing the fixture data through a fixture maintenance model to determine a maintenance operation for the fixture, the fixture operations model trained with fixture data previously received from the fixture and other fixtures associated with the facility; determining a plurality of parameters based on the maintenance operation and fixture data previously received from the fixture; and providing the maintenance operation and associated parameters to the fixture. In some embodiments, the fixture operation determining systems further comprise a user-interface. In some embodiments, the operations further comprise: providing the maintenance operation and associated parameters to the user-interface instead of the fixture; receiving, from the user-interface, a selection of maintenance operations for the fixture; and providing the selection of maintenance operations and associated parameters to the fixture. In some embodiments, the at least one EM element comprises an actuator or a sensor. In some embodiments, the operations further comprise providing the maintenance operation and associated parameters to a group of fixtures associated with the fixture. In some embodiments, the operations further comprise providing the maintenance operation and associated parameters to an endpoint device associated with the fixture instead of directly to the fixture. In some embodiments, the EM element comprises a water valve. In some embodiments, the maintenance operation comprises a purge operation. In some embodiments, the parameters comprise a start time and a length of execution. In some embodiments, the fixture comprises a thermal mixing valve, a fire protection device, a drain, a contamination monitor, an air quality monitor, a door handle, or a waste receptacle.

It is appreciated that methods in accordance with the present disclosure can include any combination of the aspects and features described herein. That is, methods in accordance with the present disclosure are not limited to the combinations of aspects and features specifically described herein, but also may include any combination of the aspects and features provided.

The details of one or more implementations of the present disclosure are set forth in the accompanying drawings and the description below. Other features and advantages of the present disclosure will be apparent from the description and drawings, and from the claims.

BRIEF DESCRIPTION OF THE DRAWINGS

A better understanding of the features and advantages of the present subject matter will be obtained by reference to the following detailed description that sets forth illustrative embodiments and the accompanying drawings of which.

DETAILED DESCRIPTION

Figure 1:
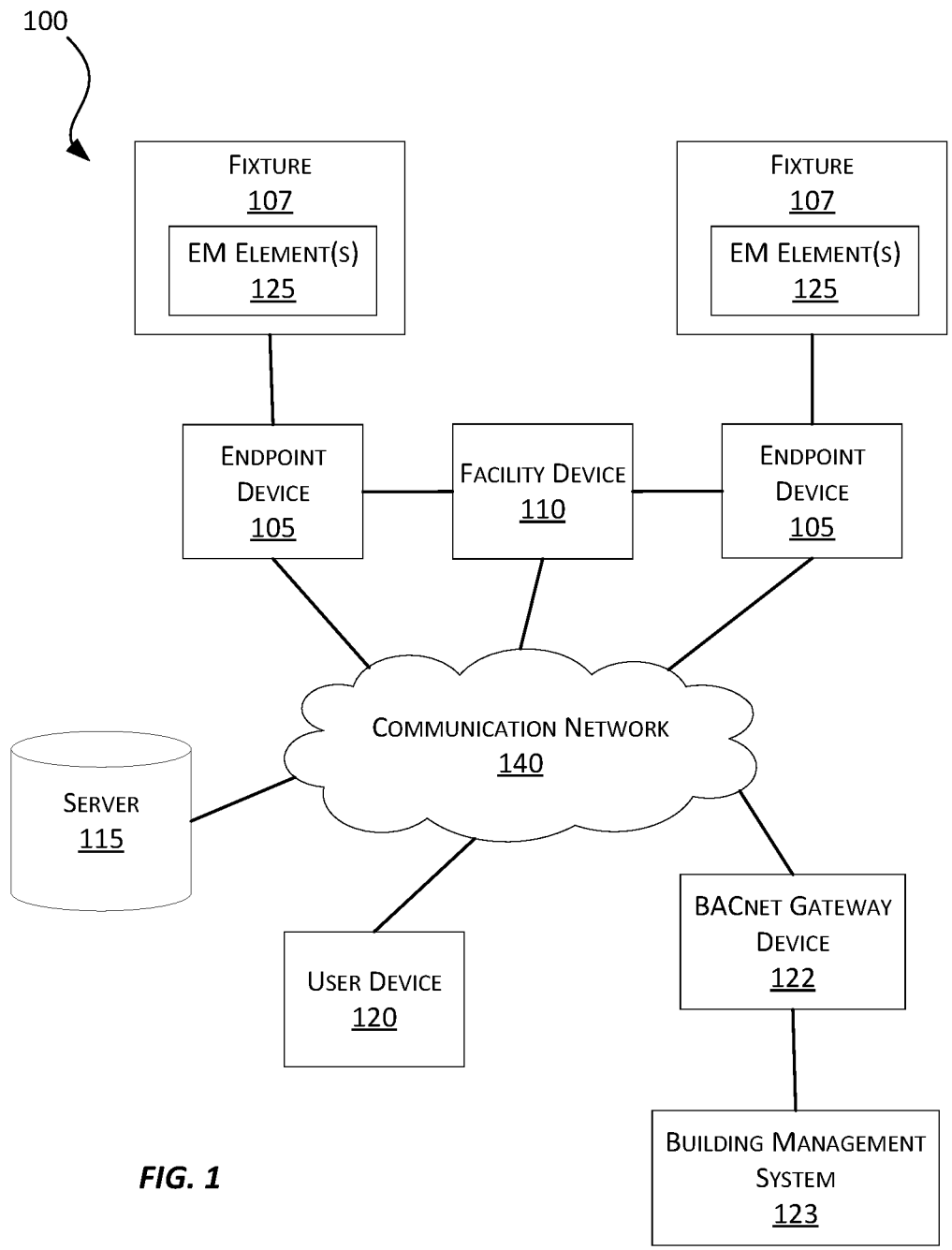
FIG. 1 depicts a non-limiting exemplary embodiment of a system for monitoring and managing a facility having a plurality of end point devices that can be employed to execute implementations of the present disclosure.

Before any embodiments of the disclosure are explained in detail, it is to be understood that the disclosure is not limited in its application to the details of embodiment and the arrangement of components set forth in the following description or illustrated in the following drawings. The disclosure is capable of other embodiments and of being practiced or of being carried out in various ways. Also, it is to be understood that the phraseology and terminology used herein is for the purpose of description and should not be regarded as limiting. The use of "including," "comprising" or "having" and variations thereof herein is meant to encompass the items listed thereafter and equivalents thereof as well as additional items. The terms "mounted," "connected" and "coupled" are used broadly and encompass both direct and indirect mounting, connecting and coupling. Further, "connected" and "coupled" are not restricted to physical or mechanical connections or couplings, and can include electrical or hydraulic connections or couplings, whether direct or indirect.

It should also be noted that a plurality of hardware and software-based devices, as well as a plurality of different structural components may be used to implement the implementations. In addition, implementations may include hardware, software, and electronic components or modules that, for purposes of discussion, may be illustrated and described as if the majority of the components were implemented solely in hardware. However, one of ordinary skill in the art, and based on a reading of this detailed description, would recognize that, in at least one implementation, the electronic based aspects of the disclosure may be implemented in software (for example, stored on non-transitory computer-readable medium) executable by one or more processors. As such, it should be noted that a plurality of hardware and software-based devices, as well as a plurality of different structural components may be utilized to implement various implementations. It should also be understood that although certain drawings illustrate hardware and software located within particular devices, these depictions are for illustrative purposes only. In some implementations, the illustrated components may be combined or divided into separate software, firmware and/or hardware. For example, instead of being located within and performed by a single electronic processor, logic and processing may be distributed among multiple electronic processors. Regardless of how they are combined or divided, hardware and software components may be located on the same computing device or may be distributed among different computing devices connected by one or more networks or other suitable communication links.

Embodiments of the present disclosure are generally directed to systems for determining and executing operations for fixtures deployed throughout facility. More particularly, embodiments of the present disclosure are directed to systems for monitoring fixtures deployed throughout facility to determine operation for the fixture and provide the operations to the fixture, which are configured to determine and store commands to execute the received operations.

Accordingly, described herein, in certain embodiments, are fixtures comprising: an EM element; a communication interface; a processor; and a computer-readable storage media coupled to the processor and having instructions stored thereon which, when executed by the processor, cause the processor to perform operations comprising: receiving, from a service via the communication interface, parameters for scheduling an operation of the fixture; determining, based on the parameters, a plurality of commands for the EM element and a respective time to execute each of the commands; providing, at the respective time, each of the commands to the respective EM element for execution; providing, via the communication interface, an indication of completion of the operation of the fixture to the service.

Also described herein, in certain embodiments, are methods for determining a maintenance operation for a fixture. These the methods comprise: receiving, from a fixture associated with a facility, fixture data related to an operation of at least one EM element of the fixture; processing the fixture data through a fixture maintenance model to determine a maintenance operation for the fixture, the fixture operations model trained with fixture data previously received from the fixture and other fixtures associated with the facility; determining a plurality of parameters based on the maintenance operation and fixture data previously received from the fixture; and providing the maintenance operation and associated parameters to the fixture.

Also described herein, in certain embodiments, fixture operation determining systems. These systems comprise: a processor; and a computer-readable storage device coupled to the processor and having instructions stored thereon which, when executed by the processor, cause the processor to perform operations comprising: receiving, from a fixture associated with a facility, fixture data related to an operation of at least one EM element of the fixture; processing the fixture data through a fixture maintenance model to determine a maintenance operation for the fixture, the fixture operations model trained with fixture data previously received from the fixture and other fixtures associated with the facility; determining a plurality of parameters based on the maintenance operation and fixture data previously received from the fixture; and providing the maintenance operation and associated parameters to the fixture.

Definitions

Unless otherwise defined, all technical terms used herein have the same meaning as commonly understood by one of ordinary skill in the art to which the present subject matter belongs. As used in this specification and the appended claims, the singular forms "a," "an," and "the" include plural references unless the context clearly dictates otherwise. Any reference to "or" herein is intended to encompass "and/or" unless otherwise stated.

As used herein, the term "real-time" refers to transmitting or processing data without intentional delay given the processing limitations of a system, the time required to accurately obtain data and images, and the rate of change of the data and images. In some examples, "real-time" is used to describe the presentation of information obtained from components of embodiments of the present disclosure.

FIG. 1 depicts an exemplary embodiment of a system 100 that can be employed to execute implementations of the present disclosure. The example system 100 may be employed to, for example, monitor and manage a facility such as a building or one or more rooms within a building. As depicted, the system 100 includes a plurality of endpoint devices 105 (collectively referred to herein as "the endpoint devices 105" and individually as "an endpoint device 105"), a plurality of fixtures 107 (collectively referred to herein as "the fixtures 107" and individually as "a fixture 107"), a facility device 110 (for example, a gateway), a server 115 (for example, cloud server), a user device 120, a BACnet gateway device 122, and a building management system (BMS) 123. In some embodiments, the system 100 includes fewer, additional, or different components than depicted in FIG. 1. For example, the system 100 may include multiple facility devices 110, servers 115, user devices 120, BACnet gateway devices 122, or a combination thereof. Additionally, the system 100 may include any number of endpoint devices 105 and/or fixtures 107 and the two endpoint devices and fixtures depicted in FIG. 1 are purely for illustrative purposes. In some embodiments, one or more of the components of the system 100 are distributed among multiple devices, combined within a single device, or a combination thereof. As one example, in some embodiments, one or more of the endpoint devices 105 may be incorporated within a fixture 107 as a single device. Accordingly, in some embodiments, the functionality described as being performed by the endpoint device 105 (or a portion thereof) may be performed by a fixture 107 (including built-in or attached similar hardware and software components as the endpoint device 105).

In some embodiments, the endpoint devices 105, the fixtures 107, the facility device 110, the server 115, the user device 120, the BACnet gateway device 122, and the BMS 123 communicate over one or more communication networks 140. Portions of the communication networks 140 may be implemented using a wide area network (WAN), such as the Internet or a LoRa system, a local area network (LAN), such as a Bluetooth™ network or Wi-Fi, and combinations or derivatives thereof. In some embodiments, the communication network 140 includes a telecommunication network or data network. In some embodiments, the communication network 140 can be accessed over a wired or a wireless communications link, such as a network gateway.

In some embodiments, the communication network 140 includes a network of physical objects (or IoT) with mesh and start topological structures (e.g., Narrowband IoT (NBIOT), Long Range (LoRa), ZigBee, general package radio service (GPRS), and Long-Term Evolution (LTE) category M1 (Cat1)). In some embodiments, the physical objects forming the communication network 140 include one or more components of the system 100. In some embodiments, one or more components of the system 100 communicate via LoRa or LoRaWAN networking protocols (for example, the endpoint device 105 and the facility device 110). In some embodiments, protocols can be adopted within the network 210 for specific applications and environments. For example, mesh topology can be used for IOTs of a smaller scale. Moreover, a mesh topology generally supports longer distance data transmission and can be used for IOTs of a larger scale. Using such networking protocols provides for secure, encrypted communication of data without use of a customer or building network. Accordingly, use of such networking protocols may isolate an endpoint device 105 (or other component of the system 100) from a customer or building network.

Accordingly, in some embodiments components of the system 100 can be configured to communicate via Bluetooth, Wi-Fi, Zigbee, LTE/Cellular, wired ethernet, RS485/RS232, or the like. As one example, the endpoint devices 105 may communicate via LoRa with the facility device 110. In some embodiments, one or more components of the system 100 communicate directly as compared to through the communication network 140. For example, the endpoint devices 105 may communicate directly with the facility device 110. Also, in some embodiments, the components of the system 100 communicate through one or more intermediary devices (not shown in FIG. 1).

In some embodiments, the fixture 107 provides a water management solution, a building maintenance solution, a building operation solution, a building management solution, or a combination thereof. Example embodiments of fixture 107 include a faucet, a flushometer, a flush valve, a soap dispenser, a handwashing system, a water service line monitor, a backflow preventer, a floor drain, a hand dryer, a pressure sensor, a water use sensor, a flow sensor, a valve sensor, a lavatory, a toilet, a urinal, a water closet, a bottle and glass filler, a drain (e.g., a sink drain, a roof drain or floor drain network, and the like), a drinking water fountain, an air quality monitor, an air or room quality sensor (e.g., a service request or product replenishment request button or other suitable activator), a backflow preventer, a leak detection sensor, an occupancy detection sensor, a resource dispenser (e.g., a soap dispenser, a sanitizer dispenser, a room deodorizer dispenser, a paper tower dispenser), a fire protection device or fixture (e.g., a smart fire protection device or fixture), a waste receptacle (e.g., a garbage can or bin), a door handle, a thermal mixing valve, a contamination monitor (e.g., a *legionella* contamination sensor), and the like.

As depicted in FIG. 1, each of the fixtures 107 is associated with one or more EM elements 125. In some embodiments, the EM elements 125 are configured to monitor or influence the operation of the fixture 107. Example embodiments of fixture 107 include an EM element 125 include an actuator, a flow sensor, a position sensor, a proximity sensor, a thermocouple, and the like. In some embodiments, the EM elements 125 include an electrical only element, a mechanical only element, or a combination of an electrical and a mechanical element(s). In some embodiments, the EM elements 125 include a single-piece component or multiple components.

As an example, in some embodiments, the fixture 107 is a faucet having a sensor (e.g., as a first EM element 125) configured to detect the presence of a person within a specified zone. In some embodiments, when the sensor is triggered (e.g., by detecting the presence of the person), the sensor sends an "ON" signal to an actuator (as a second EM element 125) (e.g., a valve actuating solenoid) thereby allowing water to selectively flow through the faucet. In some embodiments, when the sensor is no longer triggered (e.g., by detecting the absence of a person), the sensor sends an "OFF" signal to the actuator to stop water flow through the faucet. In some embodiments, the actuator is configured to maintain the faucet in an open position for a predetermined period of time in response to receiving an "ON" signal. In some embodiments, the predetermined period of time is set by a user or facility entity via, for example, the facility device 110, the user device 120, another component of the system 100, or a combination thereof.

As another example, in some embodiments, the fixture 107 is a flush valve having a sensor (e.g., as a first EM element 125) configured to detect the presence of a person within a specified zone. In some embodiments, when the sensor is triggered (e.g., by detecting the presence of a person), the sensor sends an "ON" signal to the actuator (as a second EM element 125) (e.g., a valve actuating solenoid) to actuate a valve and initiate a flow of water for a flushing event. In some embodiments, the flush valve remains open for a predetermined period of time (e.g., 5 seconds, 10 seconds, 15 seconds, 20 seconds, 30 seconds, 45 seconds, 1 minute, 2 minutes, 3 minutes, 4 minutes, 5 minutes, and the like) at least partially dependent upon an operating parameter set by the user via, for example, the facility device 110, the user device 120, another component of the system 100, or a combination thereof.

As another example, in some embodiments, the fixture 107 is a resource dispenser (e.g., a soap dispenser or a hand towel dispenser) having a sensor (e.g., as a first EM element 125) configured to detect the presence of a person within a specified zone. In some embodiments, when the sensor is triggered (e.g., by the hands of a person), the sensor sends an "ON" signal to an actuator (e.g., as a second EM element 125) to trigger a resource dispensing event (e.g., actuation of a gear, a valve, or solenoid, and the like to initiate dispensing of a resource). In some embodiments, the resource dispenser is configured to allow a predetermined volume or amount of a resource to be dispensed for each activation. In some embodiments, the volume, amount, or timing of a resource to be dispensed is set and adjusted by the user via, for example, the facility device 110, the user device 120, another component of the system 100, or a combination thereof.

In some embodiments, the resource dispenser includes a second sensor e.g., as a third EM element 125) to monitor the level or amount of resource remaining in a reservoir or receptacle. In some embodiments, the second sensor detects a current level or amount of resource in the reservoir or receptacle at a given moment in time. In some embodiments, the second sensor detects when the resource falls below a predetermined amount or level.

As another example, in some embodiments, the fixture 107 is a water service line monitor. In some embodiments, the water service line monitor includes a sensor (e.g., as a first EM element 125) configured to be retrofit onto an existing water service line and is configured to monitor the flowrate of water therethrough, the presence of a backflow event, or a combination thereof. In some embodiments, the sensor is configured to detect a flow rate, a presence of a backflow event, and the like.

As another example, in some embodiments, the fixture 107 is a contamination monitor. In some embodiments, the contamination monitor includes a sensor (e.g., as a first EM element 125) for detecting contamination of a water supply, such as *legionella* contamination, microorganism contamination, nitrate and nitrite contamination, and the like. Accordingly, in some embodiments, the sensor is configured to detect the existence of a contaminant, a contamination level, or a combination thereof. A contaminant may include, for example, lead, copper, chlorine, arsenic, nitrate, fluoride, mercury, microorganism(s) (e.g., bacteria, viruses, parasites, and the like), and the like. In some embodiments, the sensor is configured to be retrofitted onto an existing water service line (e.g., in a water pipe or at a water valve). As an example, in some embodiments, the sensor is a *legionella* contamination sensor configured to detect the existence of and a contamination level of *legionella* of water in a water service line.

As another example, in some embodiments, the fixture 107 is a thermal mixing valve (e.g., a thermostatic mixing valve) having a first valve (e.g., a first EM element 125) associated with a hot water input, a second valve (e.g., a second EM element 125) associated with cold water input, and at least one valve actuator (e.g., a third EM element 125). In some embodiments, the at least one valve actuator is a mechanism that receives a temperature input or control (e.g., from a user of a faucet associated with the thermal mixing valve). In some embodiments, a valve actuator includes, for example, a faucet handle, a temperature dial, or another type of temperature input mechanism. In some embodiments, when the thermal mixing valve is associated with a faucet and the faucet is "ON" (i.e., water is flowing), a user of the faucet may provide a temperature input or control via the at least one valve actuator. In some embodiments, based on the temperature input or control, the first valve, the second valve, or a combination thereof, are actuated such that the temperature input or control provided by the user is applied to the water flowing through the faucet.

In some embodiments, the thermal temperature valve is associated with a temperature sensor (e.g., a fourth EM element 125) configured to detect and monitor a temperature associated with water flowing through the faucet, a temperature associated with a temperature input or control provided via the valve actuator, or a combination thereof. For example, in some embodiments, the temperature sensor detects a temperature associated with water flowing through the faucet such that the temperature is monitored in comparison to a temperature threshold or range. As an example, in some embodiments, when the temperature detected by the sensor is outside of a temperature range (e.g., too hot or too cold) a warning or alert is issued. In some embodiments, when the temperature exceeds the temperature range or threshold, the warning or alert indicates a scalding condition where the water flowing through the faucet is too hot. In some embodiments, when the temperature is below the temperature range or threshold, the warning or alert indicates a cold-water condition where the water flowing through the faucet is too cold or a fault with a hot water heater or heating system of a building.

As another example, in some embodiments, the fixture 107 is an air quality monitor having an air quality sensor (e.g., a first EM element 125) configured to detect and monitor an air condition associated with a facility. In some embodiments, the air quality sensor collects data associated with a facility such that the facility is monitored for indoor air pollutants. In some embodiments, an indoor air pollutant includes, for example, carbon monoxide (CO), radon, nitrogen dioxide (NO2), second-hand smoke, lead particles, mold, and the like. In some embodiments, the air quality monitor includes an alert mechanism (e.g., a second EM element 125) that provides or generates an audible alert, a visual alert, another type of alert, or a combination thereof. In some embodiments, the alert mechanism includes, for example, a speaker for generating an audible alert, an LED or other display device for generating a visual alert, and the like.

As another example, in some embodiments, the fixture 107 is a door handle. In some embodiments, the door handle is associated with a door (e.g., a bathroom stall door, a family bathroom door, or a door of a facility as a whole). In some embodiments, the door handle includes a sensor (e.g., a first EM element 125) configured to monitor or detect use of the door associated with the door handle. In some embodiments, the sensor detects an occupancy of a family bathroom by monitoring the opening and closing of the door handle. In some embodiments, the sensor detects an overall use of a specific bathroom stall based on how often the door handle associated with that specific bathroom stall is opened and closed within a predetermined period of time, such as a 24-hour period, a hour period, a week, and the like.

As another example, in some embodiments, the fixture 107 is a fire protection device (e.g., a fire suppression device, a smoke detector, or a sprinkler) having a sensor (e.g., a first EM element 125) configured to monitor an environment for the presence of a fire condition, such as smoke. In some embodiments, when the sensor is triggered (e.g., by detecting the presence of a fire condition), the sensor sends an "ON" signal to the actuator (as a second EM element 125) (e.g., a valve actuating solenoid) to actuate a valve and initiate a release of a fire suppressing agent, such as water. In some embodiments, the valve remains open for a predetermined period of time at least partially dependent upon an operating parameter set by the user via, for example, the facility device 110, the user device 120, another component of the system 100, or a combination thereof. In some embodiments, the valve remains open until receipt of a manual shut off signal (e.g., from a fire fighter) via, for example, the facility device 110, the user device 120, another component of the system 100, or a combination thereof. In some embodiments, the valve remains open until the sensor is no longer triggered (e.g., when the presence of the fire condition is no longer detected). For example, in some embodiments, when the sensor is no longer triggered (e.g., by detecting the absence of a fire condition), the sensor sends an "OFF" signal to the actuator to stop the release of the fire suppressing agent.

In some embodiments, the sensor is configured to detect an operational status of the fire protection device. As an example, in some embodiments, an operational status of the fire protection device is "operational" when the fire protection device is operating as expected or designed. As another example, in some embodiments, an operational status of the fire protection device is "not operational" when the fire protection device is not operating as expected or designed. As another example, in some embodiments, the operational status of the fire protection device is "in need of service" when the fire protection device is in need of service. In some embodiments, the sensor detects or checks the operational status of the fire protection device according to a predetermined schedule, such as every week, every day, every month, and the like.

As another example, in some embodiments, the fixture 107 is a waste receptacle (e.g., a trash or garbage can, a waste disposal container, a sanitary napkin disposal receptacle, a biohazard or medical waste disposal receptacle, and the like) having a sensor (e.g., a first EM element 125) configured to monitor the level or amount of waste in a reservoir or receptacle. In some embodiments, the sensor detects a current level or amount of waste in the container or receptacle. In some embodiments, the sensor is configured to monitor or detect a usage of the waste receptacle (e.g., how many times the waste receptacle is used). As an example, in some embodiments, the sensor is configured to count the number of times a lid of the waste receptacle is opened or triggered to open via, for example, a foot-pedal. As another example, in some embodiments, the sensor is configured to count how many times waste is deposited into the waste receptacle via, for example, motion sensing.

As another example, in some embodiments, the fixture 107 is a drain (e.g., a sink drain, a roof drain, a floor drain, and the like) having a sensor (e.g., a first EM element 125) configured to monitor an amount of water flowing through the drain. In some embodiments, the drain is a sink drain, and the sensor monitors an amount of water flowing through the sink drain such that a usage of a sink associated with the sink drain may be monitored, a run-on condition of a faucet associated with the sink drain may be detected, and the like. In some embodiments, the drain is a floor drain, and the sensor monitors an amount of water flowing through the floor drain such that a usage of a shower stall associated with the floor drain may be monitored, an over-flow condition or leak condition of another fixture (e.g., a facet, or a toilet) is detected, and the like. In some embodiments, the drain is a roof drain, and the sensor monitors an amount of water flowing through the roof drain such that usage of the roof drain is monitored and used to determine, for example, maintenance needs, predict remaining life cycle of the roof drain, and the like. In some embodiments, the sensor monitors a flow rate of water flowing through the roof drain in comparison to other roof drains. For example, in some embodiments, when two roof drains are experiencing a heavy water flow while a third roof drain (proximate to the two roof drains) is experiencing little to no water flow, the third roof drain may be clogged or obstructed (e.g., by leaves or other debris). Accordingly, in some embodiments, the system 100 include a network of fixtures, such as a first fixture, a second fixture, and the like (e.g., a network of roof drains).

As depicted in FIG. 1, in some embodiments, the endpoint device 105 includes a communication link with at least one fixture 107. In some embodiments, the endpoint devices 105 span multiple facilities, locations, rooms, and the like. In some embodiments, each of the endpoint devices 105 is associated with (e.g., located within) the same facility (e.g., a restroom). In some embodiments, the each of the endpoint devices 105 is associated with multiple facilities. As an example, a first endpoint device may be associated with a first facility and a second endpoint device may be associated with a second different facility that is either in the same building as the first facility or in an entirely different building. In some embodiments, each of the endpoint devices 105 is associated with the same type of restroom fixture (e.g., the fixture 107). However, in other embodiments, the each of the endpoint devices 105 is associated with multiple different types of restroom fixtures (e.g., the fixture 107). For example, a first endpoint device may be associated with a faucet (as a first fixture 107) and a second endpoint device may be associated with a soap dispenser (as a second fixture 107).

Figure 2:
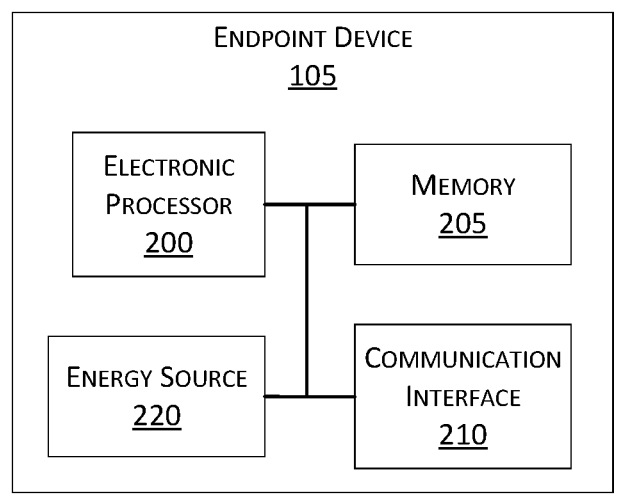
FIG. 2 depicts a non-limiting exemplary embodiment of an end point device.

FIG. 2 depicts an exemplary embodiment of the endpoint device 105. As depicted, the endpoint device 105 includes an electronic processor 200, a memory 205, a communication interface 210, and an energy source 220. In some embodiments, the electronic processor 200, the memory 205, the communication interface 210, and the energy source 220 communicate wirelessly, over one or more communication lines or buses, or a combination thereof. In some embodiments, one or more components of the endpoint device 105 are distributed among multiple devices, integrated into a single device, or a combination thereof. In some embodiments, the endpoint device 105 perform additional functionality other than the functionality described herein. In some embodiments, the endpoint device 105 include additional, different, or fewer components than those illustrated in FIG. 2. As an example, in some embodiments, the endpoint device 105 includes multiple energy sources 220. As another example, in some embodiments, the endpoint device 105 includes one or more expansion ports allowing for future expansion of the endpoint device 105. As such example, additional EM elements of a fixture 107 may be connected to the endpoint device 105 via the one or more of the expansion ports.

In some embodiments, the communication interface 210 allows the endpoint device 105 to communicate with devices external to the endpoint device 105. For example, as depicted in FIG. 1, the endpoint device 105 may communicate with the fixture 107 (or an EM element 125 thereof), the facility device 110, the server 115, the user device 120, the BACnet gateway device 122, the BMS 123, or a combination thereof through the communication interface 210. In some embodiments, the communication interface 210 includes a port for receiving a wired connection to an external device (e.g., a universal serial bus (USB) cable), a transceiver for establishing a wireless connection to an external device (e.g., over one or more communication networks 140, such as the Internet; LAN; a WAN, such as a LoRa network or system, and an so forth), or a combination thereof. As an example, in some embodiments, the communication interface 210 includes a port for receiving a wired connection between the facility device 110 and an EM element 125 of a corresponding fixture 107. As another example, in some embodiments, the communication interface 210 includes a radio or transceiver for establishing a wireless connection, over a LoRa system or network, between the endpoint device 105 and the facility device 110.

In some embodiments, the electronic processor 200 includes a microprocessor, an application-specific integrated circuit (ASIC), or a suitable electronic device for processing data. In some embodiments, the memory 205 includes a non-transitory, computer-readable storage medium. In some embodiments, the electronic processor 200 is configured to access and execute computer-readable instructions ("software") stored in the memory 205. In some embodiments, the software includes firmware, one or more applications, program data, filters, rules, one or more program modules, and other executable instructions. For example, in some embodiments, the software includes instructions and associated data for performing a set of functions, including the methods described herein. For example, in some embodiments, the electronic processor 200 is configured to enable management or monitoring of the operation of the corresponding fixture 107 either directly or indirectly (e.g., via the EM element(s) 125 of the corresponding fixture 107). In some embodiments, the electronic processor 200 enables management or monitoring of the operation of a corresponding fixture 107 by receiving fixture data from the fixtures 107, converting the fixture data for transmission, and enabling transmission of the converted data to, for example, the facility device 110, the server 115, the user device 120, the BACnet gateway device 122, another component of the system 100, or a combination thereof.

In some embodiments, the electronic processor 200 is configured to interact with and collect data (either directly or indirectly) regarding an operation of a fixture 107 (as fixture data) via the EM elements 215. In some embodiments, the endpoint device 105 is configured to remain in a sleep mode (or deep sleep mode) until an action or operation is detected with respect to a fixture 107 associated with the endpoint device 105 (e.g., detecting the presence of a user). In response to detecting the action or operation, the endpoint device 105 may then wake-up to receive fixture data, convert the fixture data for transmission, and transmit the fixture data (in a minimum power consumption mode) to, for example, the facility device 110, the server 115, the user device 120, another component of the system 100, or a combination thereof. This results in optimized battery life for the product. To further aid in the power optimization, in some embodiments, the transmission of converted fixture data (e.g., as one or more data packets) from the endpoint device 105 to the facility device 110 occurs through an adaptable data rate that automatically selects an available channel.

As depicted in FIG. 2, the endpoint device 105 includes the energy source 220. In some embodiments, the energy source 220 powers one or more components of the endpoint device 105, such as the electronic processor 200. In some embodiments, the energy source 220 is a battery, such as an energy efficient battery, a re-chargeable battery, a lithium-ion battery, a replaceable battery, and the like. As an example, in some embodiments the energy source 220 is a standard battery (e.g., an AAA, AA, C, or D sized batteries). As noted above, in some embodiments, the endpoint device 105 includes multiple energy sources 220 (e.g., a first energy source, a second energy source, and the like). In such embodiments, the multiple energy sources 220 are the same type, different types, or a combination thereof. As an example, in some embodiments, the endpoint device 105 includes three AA batteries as the energy sources 220. In some embodiments, the endpoint device 105 is coupled to and receives power from a power source associated with the facility, the building, another component, and the like.

In some embodiments, one or more components of the system 100 are present in a completed fixture 107 (e.g., a proximity sensor and an actuator in an automated faucet). In such embodiments, additional components may be retrofit onto the existing fixture 107. Accordingly, in some embodiments, the endpoint device 105 (or components thereof) may be retrofit onto or into the existing fixture 107. As an example, in some embodiments, a transmitter, a receiver, a transceiver, or a combination thereof (as part of the communication interface 210), the electronic processor 200, the energy source 220, or a combination thereof are mounted in the plumbing immediately upstream of a particular fixture 107. In other examples, in some embodiments, the retrofit includes updating firmware in the existing device. In still other examples, in some embodiments, the retrofit includes integrating elements into a previously existing fixture 107.

Figure 3:
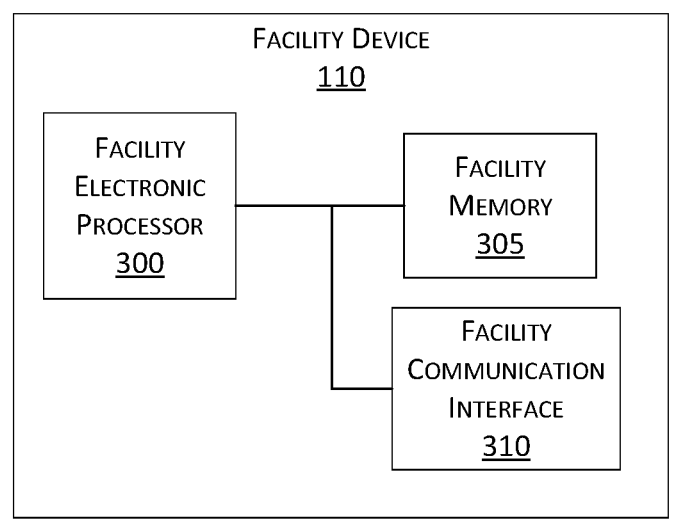
FIG. 3 depicts a non-limiting exemplary embodiment of a facility device.

FIG. 3 depicts an exemplary embodiment of the facility device 110. As depicted, the facility device 110 includes a facility electronic processor 300, a facility memory 305, and a facility communication interface 310. In some embodiments, the facility electronic processor 300, the facility memory 305, and the facility communication interface 310 communicate wirelessly, over one or more communication lines or buses, or a combination thereof. In some embodiments, the facility device 110 includes additional, different, or fewer components than those illustrated in FIG. 3. For example, in some embodiments, the facility device 110 includes a human-machine interface for interacting with a user. In some embodiments, the human machine interface includes one or more input devices, one or more output devices, or a combination thereof. In some embodiments, one or more components of the facility device 110 are distributed among multiple devices, integrated into a single device, or a combination thereof. In some embodiments, the functionality (or a portion thereof) described herein as being performed by the facility device 110 is be distributed among multiple devices.

In some embodiments, the facility device 110 communicates with external devices via the facility communication interface 310. For example, in some embodiments and as illustrated in FIG. 1, the facility device 110 communicates with the endpoint devices 105, the fixtures 107, the server 115, the user device 120, the BACnet gateway device 122, or a combination thereof through the facility communication interface 310. In some embodiments, the facility communication interface 310 includes a port for receiving a wired connection (e.g., a USB cable) to an external device, a transceiver for establishing a wireless connection (e.g., over one or more communication networks 140, such as the Internet; a LAN; or a WAN, such as a LoRa system) to an external device, or a combination thereof.

In some embodiments, the facility electronic processor 300 is configured to access and execute computer-readable instructions ("software") stored in the facility memory 305. In some embodiments, the software includes firmware, one or more applications, program data, filters, rules, one or more program modules, and other executable instructions. For example, in some embodiments, the software includes instructions and associated data for performing a set of functions, including the methods described herein.

In some embodiments, the facility device 110 serves as a gateway or intermediary device that receives data and forwards the data to another component for processing. As an example, in some embodiments, the facility device 110 receives fixture data from the electronic processors 200 of one or more of the endpoint devices 105 and forwards the data to another component for processing, such as the server 115, the user device 120, or a combination thereof. Accordingly, in some embodiments, the facility device 110 forwards the data to a remote server (e.g., the server 115) for virtual processing. As another example, in some embodiments, the facility device 110 receives processed data (e.g., fixture data processed by the server 115) from a remote server (e.g., the server 115) and forwards the processed data to another component, such as the BACnet gateway device 122, for further processing. In such embodiments and as described in greater detail below, data may be converted from LoRa to BACnet. As noted above, in some embodiments, the functionality (or a portion thereof) performed by the facility device 110 may be performed by another remote device or server (not shown).

Returning to FIG. 1, as depicted, the server 115 and the user device 120 are computing devices, such as a desktop computer, a laptop computer, a tablet computer, a terminal, a smart telephone, a smart television, a smart wearable, or another suitable computing device that interfaces with a user. Although not depicted in FIG. 1, in some embodiments, the server 115 and the user device 120 include similar components as the facility device 110, such as an electronic processor (e.g., a microprocessor, an ASIC, or another suitable electronic device), a memory (e.g., a non-transitory, computer-readable storage medium), a communication interface (e.g., a transceiver) for communicating over the communication network 140. In some embodiments, the server 115 and the user device 120 include one or more additional communication networks or connections. In some embodiments, the server 115 and the user device 120 include one or more human machine interfaces.

In some embodiments, the server 115 includes multiple electronic processors, multiple memory modules, multiple communication interfaces, or a combination thereof. In some embodiments, the server 115 is a server-class hardware type device. In some embodiments, the functionality described herein as being performed by the server 115 may be performed in a distributed nature by a plurality of computing devices (or servers) located in various geographic locations. In some embodiments, server 115 includes computer systems using clustered computers and components to act as a single pool of seamless resources when accessed through the network 140. For example, such implementations may be used in data center, cloud computing, storage area network (SAN), and network attached storage (NAS) applications. In some embodiments, the server 115 is deployed using a virtual machine(s). For example, in some embodiments, the functionality described herein as being performed by the server 115 is performed by a plurality of computing devices included in a cloud computing environment.

In the server 115, is coupled to a at least one data store. In some embodiments, the data store is a repository for persistently storing and managing collections of data. Example data store that may be employed such as a database (e.g., lite weight database) as well as simpler store types, such as files, emails, and the like. In some embodiments, the data store includes a database, which may include a series of bytes or an organized collection of data that is managed by a database management system (DBMS). In some embodiments, the data store is provided via a distributed ledger (e.g., a blockchain).

In some embodiments, the server 115 is configured to monitor and manage one or more facilities (e.g., individual restrooms or entire buildings), which includes the fixtures 107 therein. In some embodiments, the server 115 (via an electronic processor of the server 115) receives fixture data from the facility device 110. In response to receiving the fixture data, in some embodiments, the server 115 processes the fixture data and determines usage information or patterns associated with the one or more facilities (and included fixtures 107 thereof). In some embodiments, the server 115 stores the usage information or patterns in, for example, a data store that uses the memory of the server 115. In some embodiments, the server 115 transmits the usage information or patterns to a remote device for storage.

In some embodiments, access data associated with one or more facilities (e.g., the usage information or patterns determined by the server 115) is provided to users via the user device 120. In some embodiments the user device 120 is employed by an end user (e.g., a facility entity) to monitor and manage a facility (e.g., a single restroom or multiple restrooms in a building), a building, one or more fixtures 107 of a facility or building, or a combination thereof. For example, in some embodiments, a user accesses and interacts with the data determined by the server 115 to view and understand usage patterns, which may provide insights into, for example, how to optimize cleaning and maintenance schedules; whether there is a need for additional facilities, endpoint devices; and the like. For example, in some embodiments, to communicate with the server 115 (e.g., the usage information or patterns determined by the server 115), the user device 120 stores a browser application or a dedicated software application executable by an electronic processor for interacting with the server 115.

In some embodiments, the BMS 123 is a building management or automation system that is associated with a structure (e.g., a building), one or more facilities within the building, or a combination thereof. In some embodiments, the BMS 123 is associated with multiple structures associated with a single location (e.g., an airport campus, a corporation's campus, a university or educational campus, and the like). However, in other embodiments, the BMS 123 is associated with multiple structures associated with related locations. In some embodiments, the BMS 123 is a computer-based control system that is configured to control and monitor, for example, mechanical equipment or electrical equipment, associated with a structure. As an example, in some embodiments, the BMS 123 includes ventilation, lighting, power systems, fire systems, security systems, and the like. In some embodiments, the BMS 123, including the sub-systems included therein, communicate via BACnet communication protocol(s). As noted above, in some embodiments, the BMS 123 is associated with one or more vendors. As an example, in some embodiments, the BMS 123 includes a ventilation system associated with "Vendor A" and a security system associated with "Vendor B." In some embodiments, data associated with the BMS 123 is accessible to a user via a vendor specific dashboard (e.g., a BMS dashboard) that includes a browser application or dedicated software application provided by the respective vendor. In some embodiments, users can leverage the information provided via the BMS 123 to reduce downtime of devices and fixtures and schedule, for example, preventive and proactive maintenance and repair and replacement work.

In some embodiments, a user, via the BMS 123, can schedule operations for a fixture 107. In some embodiments, a user can schedule these operations for various time windows. In some embodiments, an endpoint device 105 that is associated with the designated fixture 107 receives operations from, for example, the BMS 123 or server 115, and schedules execution of the operations by the fixture 107 at the provided execution time(s). For example, in some embodiments, the BMS 123 or server 115 provide an endpoint device 105 operation parameters such as, for example, a start time (e.g., a timestamp that includes a date and time) to execute the operation (e.g., when to begin a purge), a length of time to continue the operation (e.g., how long to continue the purge), and a current time to synchronize an internal clock. In some embodiments, the endpoint device 105 employs an internal RTC to wake up at the appointed time and provide control commands the designated fixture 107 for performing the scheduled operation. For example, in some embodiments, an endpoint device 105 receives an operation for purging a fixture. The operation may include parameters such as, for example, when to begin the purge (e.g., the date and time) and how long to conduct the purge (e.g., a number of seconds). In some embodiments, the endpoint device 105 schedules (e.g., via the memory 205) the operation based on the parameters, and at the schedule time, provides commands to the designated fixture 107 to execute the operation (e.g., a command to turn on followed by a command to turn off after the allot purge time). In some embodiments, the endpoint device 105 provides a completed message along with any other pertinent information (e.g., any error conditions) to the BMS 123 or server 115 after the operation is completed by the designated fixture 107.

In some embodiments, the endpoint devices 105 periodically provide a request for current operations to the facility device 110 or the server 115. In such embodiments, the facility device 110 or the server 115 receive the scheduled operations from the BMS 123 and provide the operations to the designated endpoint devices 105 at the time of execution. In some embodiments, the endpoint devices 105 provide commands to the designated fixtures 107 to execute the operations when the operations are received. In some embodiments, the endpoint devices 105 provide a response to the facility device 110 or the server indicating receipt of an operation.

In some embodiments, when an endpoint device 105 cannot connect to a facility device 110 or the server 115 (e.g., the connection the network 140 is dropped), the endpoint device 105 sends a request for current operations to the facility device 110 or the server 115 once a network connection is reestablished. In some embodiments, the facility device 110 or the server 115 will periodically send an operation to a designated endpoint device 105 until a receipt message is received for the endpoint device 105 (e.g., when the endpoint device has reestablished a connection to the network 140).

In some embodiments, a user can group multiple fixtures 107 and schedule operations for the group. For example, in some embodiments the fixtures 107 are grouped based on usage (e.g., how frequently the device is activated) or location (e.g., in the same room, on the same floor, in the same building, connected to a common water supply, and the like). In some embodiments, the fixtures 105 can be placed in more than one group, and as such, the respective endpoint device(s) 155 is provided the operation for each the assigned groups. In some embodiments, the operations relate to maintenance, operational efficiency, downtime reduction, real-time monitoring, and the like, of the fixtures 107.

In some embodiments, the server 115 processes received fixture data to train (e.g., based on machine learning) a usage model for the endpoint devices 105. In some embodiments, the usage model is employed to determine, for example, future use of the fixtures 107, anomalies in usage, and maintenance (e.g., purge operations). In some embodiments, the BMS 123 provides analytic data determined based on the trained usage model to users via the dashboard. In some embodiments, the users can schedule operations for the fixtures 107 based on the provided usage data. In some embodiments, the users can provide, via the dashboard, a framework (e.g., rules) to the server 115, which are integrated into the trained usage model. In some embodiments, the server 115 processes the received fixture data through the integrated, trained usage model to determine operations for the fixtures 107. in some embodiments, the operations are provided to the respective endpoint device 105 associated with the designated fixture 107 via the network 140.

For example, in some embodiments, purge operations are scheduled for one of the fixtures via the dashboard or the server 115 based on the integrated, trained usage model. In some embodiments, the purge operations include parameters such as when to purge (e.g., the time of day), how long to purge, how frequently to purge (e.g., every N number of hours, every N number of days, and the like), and the like. In some embodiments, operations are provided to the endpoint devices via the facility device 110 (e.g., a LoRa gateway) based on, for example, a unique identifier associated with each of the endpoint devices 105 or the fixtures 107. In some embodiments, the endpoint devices 105 store the operations to execute (e.g., provide the appropriate commands to the designated fixture(s) 107) at the scheduled day/time.

As another example, in some embodiments, the EM elements 125 for a fixture 107 include sensors and mixing valves with various hot/cold temp adjustment options. In some embodiments, a building has multiple thermo mixing valves (TMVs) where temperature or contamination (e.g., monitoring for *Legionella*) sensors are installed in the pipes. In some embodiments, the user provides temperature or contaminant setting rules to the server 115 that are integrated into models trained with the fixture data received from the temperature sensors. In some embodiments, the server 115 processes received fixture data through the integrated, trained models to determine operations for the EM elements 125 (e.g., the mixing valves) or alerts for the dashboard users (e.g., when at temperature range or contaminant level exceeds an upper threshold, the operations may include increasing the flow of cold water). In some embodiments, the dashboard is provided temperature or contaminant status at various nodes at a desired frequency (e.g., daily, weekly, monthly) so that the user can take appropriate actions in real time.

Figure 4:
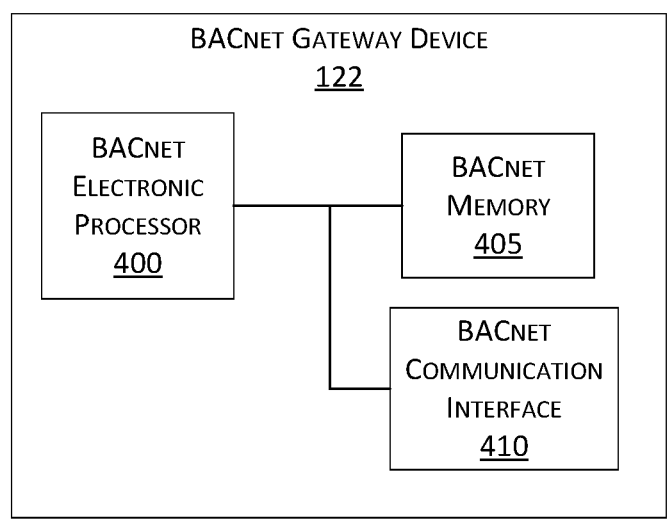
FIG. 4 depicts a non-limiting exemplary embodiment of a BACnet gateway device.

As depicted in FIG. 1, in some embodiments, the BMS 123 communicates with one or more components of the system 100 via the BACnet gateway device 122. The example embodiment of the BACnet gateway device 122 depicted in FIG. 4 includes a BACnet electronic processor 400, a BACnet memory 405, and a BACnet communication interface 410. In some embodiments, the BACnet electronic processor 400, the BACnet memory 405, and the BACnet communication interface 410 communicate wirelessly, over one or more communication lines or buses, or a combination thereof. In some embodiments, the BACnet gateway device 122 includes additional, different, or fewer components than those illustrated in FIG. 4. For example, in some embodiments, the BACnet gateway device 122 includes a human-machine interface for interacting with a user. In some embodiments, the human machine interface includes one or more input devices, one or more output devices, or a combination thereof. In some embodiments, one or more components of the BACnet gateway device 122 are distributed among multiple devices, integrated into a single device, or a combination thereof. In some embodiments, the BACnet gateway device 122 performs additional functionality other than the functionality described herein. In some embodiments, the functionality (or a portion thereof) described herein as being performed by the BACnet gateway device 122 is distributed among multiple devices.

In some embodiments, the BACnet communication interface 410 allows the BACnet gateway device 122 to communicate with devices external to the BACnet gateway device 122. For example, in some embodiments and as depicted in FIG. 1, the BACnet gateway device 122 communicates with the endpoint devices 105, the fixtures 107, the server 115, the user device 120, the BMS 123, or a combination thereof through the BACnet communication interface 410. In some embodiments, the BACnet communication interface 410 includes a port for receiving a wired connection to an external device (e.g., a USB cable and the like), a transceiver for establishing a wireless connection to an external device (e.g., the communication network 140), or a combination thereof.

In some embodiments, the BACnet electronic processor 400 is configured to access and execute computer-readable instructions ("software") stored in the BACnet memory 405. In some embodiments, the software includes firmware, one or more applications, program data, filters, rules, one or more program modules, and other executable instructions. For example, in some embodiments, the software includes instructions and associated data for performing a set of functions, including the methods described herein.

In some embodiments, the BACnet gateway device 122 serves as a gateway or intermediary device that receives data and forwards the data to another component for processing. As an example, in some embodiments, the BACnet gateway device 122 receives processed fixture data (as processed by the server 115) from the facility device 110 and converts the processed fixture data to a communication protocol, such as a BACnet communication protocol, associated with the BMS 123 (e.g., from LoRa to BACnet). In some embodiments, after converting the processed fixture data, the BACnet gateway device 122 forwards the converted fixture data to the BMS 123 (or another component of the system 100). In some embodiments, the BMS 123 enables a user of the BMS 123 to access and interact with the converted fixture data via the BMS dashboard, which may be specific to one or more vendors (as noted above). In some embodiments, the BACnet gateway device 122 receives the processed fixture data from another component of the system 100, such as the server 110 or the user device 120. Accordingly, in some embodiments, the BACnet gateway device 122 receives the processed fixture data directly from the server 110 (post-processing of the fixture data by the server 110).

Figure 5:
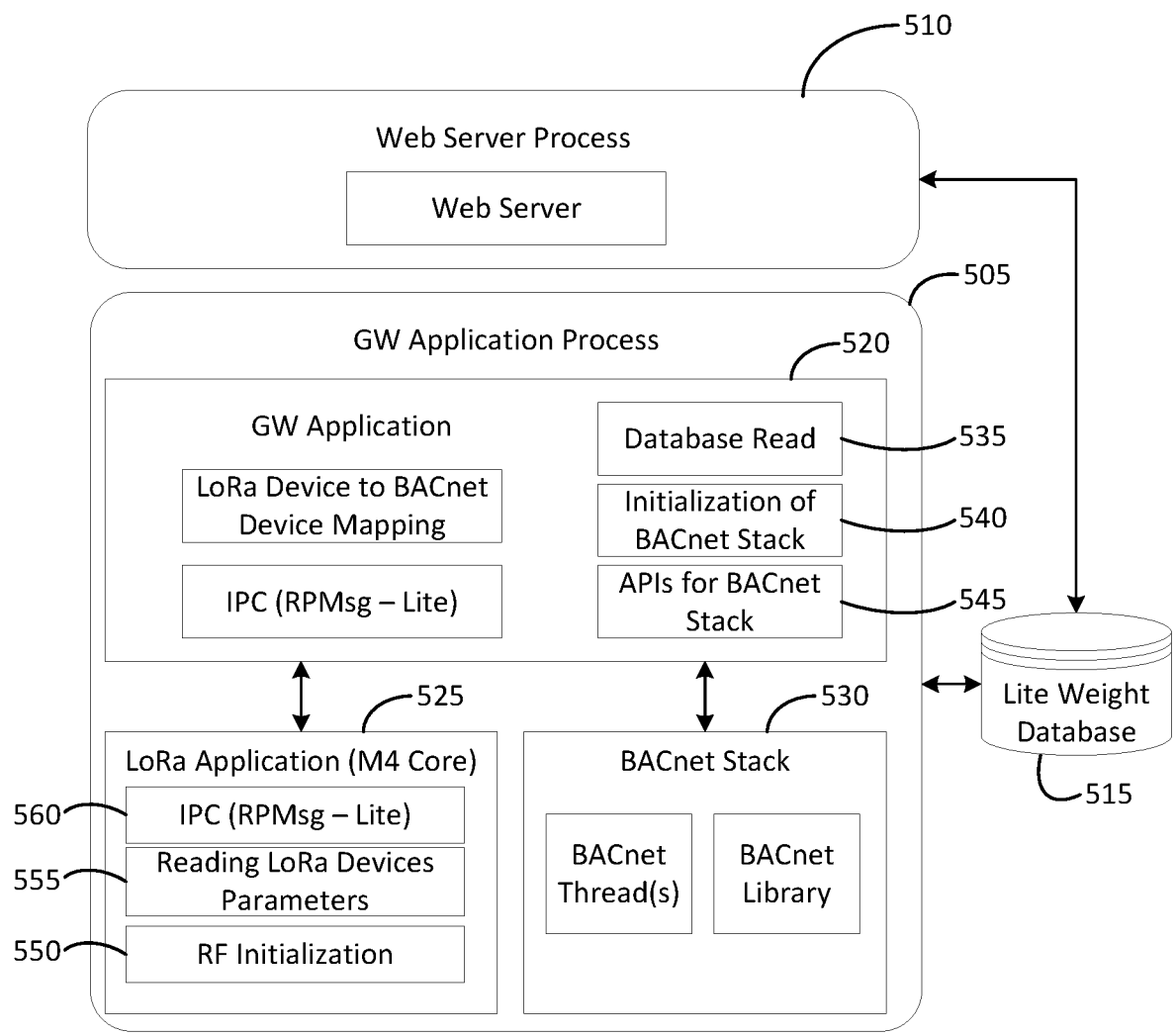
FIG. 5 depicts an architectural diagram of a non-limiting exemplary embodiment of a BACnet gateway device.

FIG. 5 depicts an exemplary embodiment of an architecture for the BACnet gateway device 122. As depicted in FIG. 5, the BACnet gateway device 122 executes or performs a gateway application process (represented by reference numeral 505), a web server application process (represented by reference numeral 510), or a combination thereof, which both access a database 515 (e.g., a lite weight database). In some embodiments, a user interface is provided to a user (e.g., via the user device 120). In some embodiments, the user interface interfaces are employed to set, for example, network parameters, BACnet stack configuration, LoRa to BACnet parameter mapping, and the like. As depicted in FIG. 5, in some embodiments, the gateway application process 505 is divided into three parts: a gateway application 520, a BACnet stack 525, and a LoRa Application 530. In some embodiments, the gateway application 520 reads configuration settings from the database 515 (represented by reference numeral 535), initializes the BACnet stack 530 (represented by reference numeral 540), registers application programming interfaces (APIs) for a LoRa call-back handler (represented by reference numeral 545), updates the BACnet stack 530 with a LoRa device, and the like. In some embodiments, the LoRa application 525 initializes an RF module (represented by reference numeral 550); reads parameters value received from a LoRa gateway, such as the facility device 110 (represented by reference numeral 555); initialize remote processor messaging (RPMsg) communication (represented by reference numeral 560), send LoRa device parameters to the BACnet stack 530, and the like. In some embodiments, the BACnet stack 530 provides the software API(s) to update device parameter values, BACnet services over ethernet, and the like.

Figure 6:
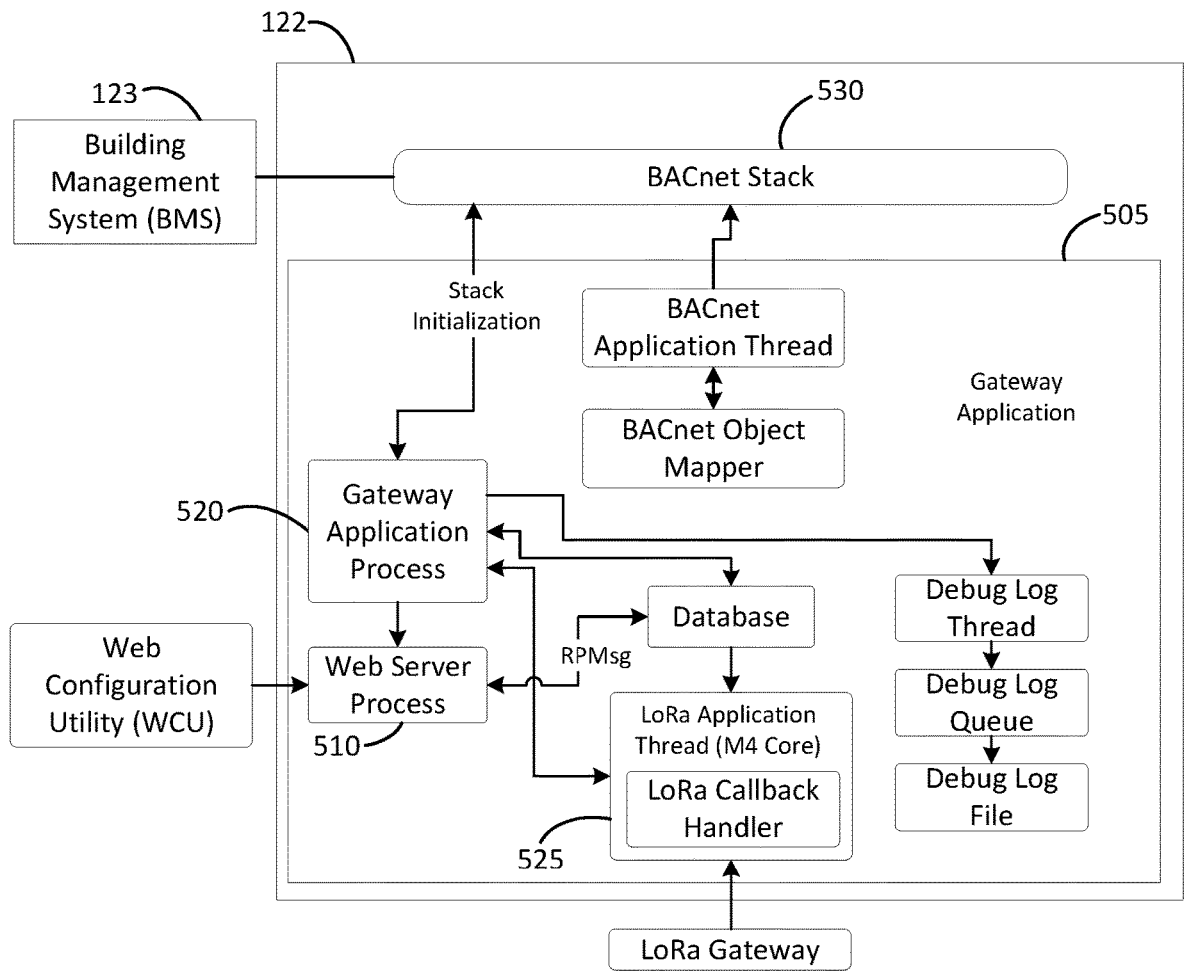
FIG. 6 depicts a flowchart of a non-limiting exemplary embodiment of a gateway application performed by a BACnet gateway device.
Figure 7:
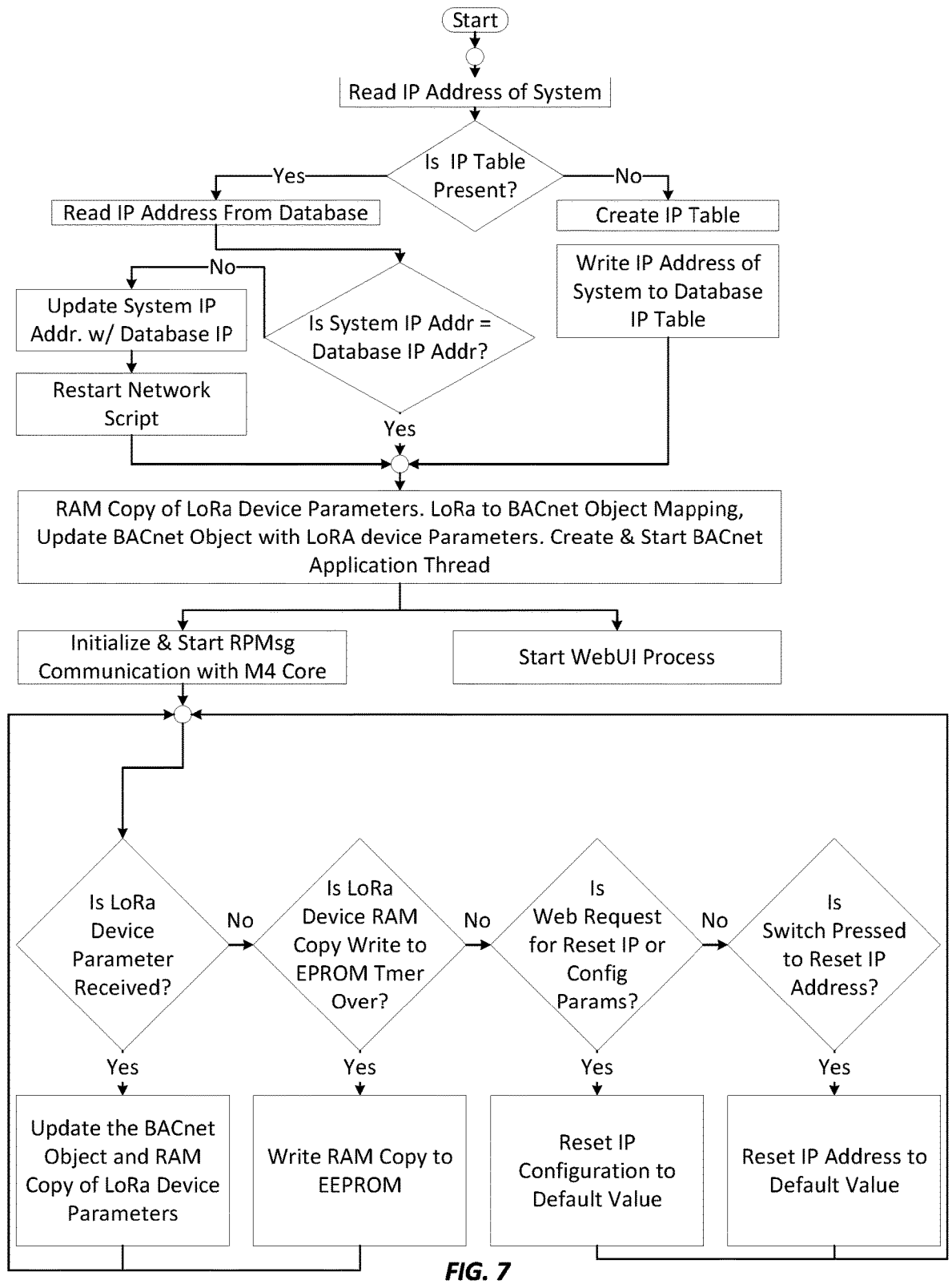
FIG. 7 depicts a flowchart of a non-limiting exemplary embodiment of example functionality performed by a gateway application.

FIG. 6 depicts an exemplary embodiment of an architecture for the gateway application executed by the BACnet gateway device 122. FIG. 7 depicts a flowchart illustrating example functionality performed by the gateway application. In the example illustrated in FIG. 6, the BACnet gateway application includes a gateway application process, a web server process, a BACnet application thread, a LoRa application, and a debug log thread. In some embodiments, the gateway application process is the main process executed by the BACnet gateway device 122 upon power ON. In some embodiments, the gateway application process performs an internet protocol (IP) acquisition function, BACnet stack initialization function (as per the database and EEPROM settings), a create thread function (for handling RPMsg communication, electrically erasable programmable read-only memory (EEPROM) read write operation, hardware switch functionality and RTC functionality), a process function (for the interprocess communication (IPC) commands for JavaScript Object Notation (JSON) file, update parameters, delete device, or the like), RPMsg communication with M4 core, EEPROM read and write operations (to store LoRa device parameters present value), reset network settings to default when hardware switch is pressed (including, for example, run time adoption of network and DACdel stack settings, syncing RTC and system time with Network Time Protocol (NTP), and the like). In some embodiments, the web server process performs Hypertext Transfer Protocol (HTTP) client communication, writing parameters into the database, and the like. In some embodiments, BACnet application thread parses the data received over RPMsg channel from M4 and set into the BACdel stack and the database. In some embodiments, LoRa application runs on cortex—M4 core. In some embodiments, the LoRa application handles LoRa RF communication and IPC using RPMsg framework, send received data to A7, and the like. In some embodiments, the debug log thread receives errors from other modules and creates a debug log file (e.g., when the debug log file creation option is enabled). In some embodiments, the debug log thread generates logs upon errors as well as debug/information logs based on the log level set.

Figure 8A:
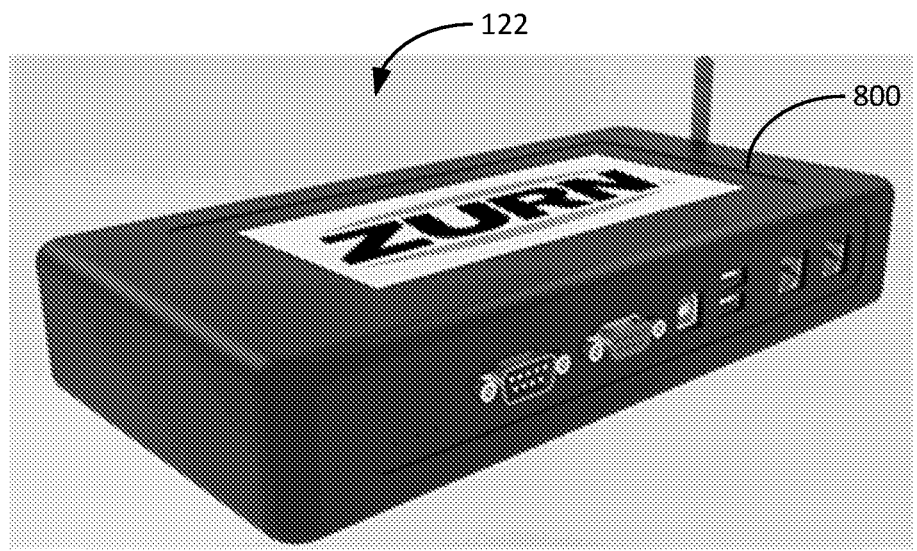
FIGS. 8A-8B depict a non-limiting exemplary embodiment of a housing for a BACnet gateway device.
Figure 8B:
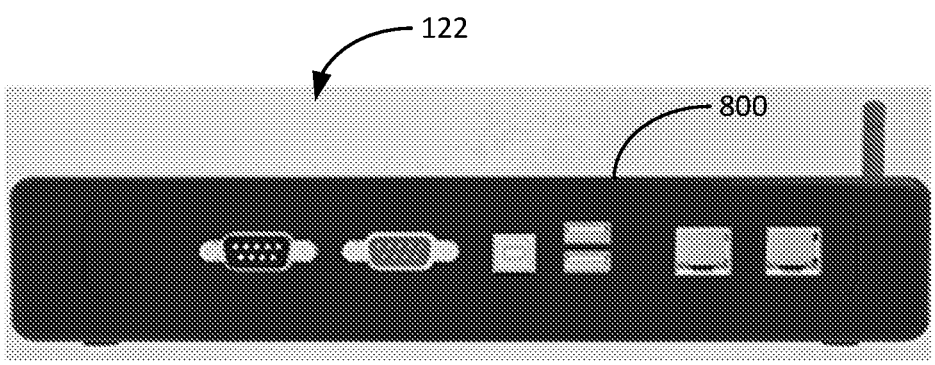

FIGS. 8A-8B depicts an exemplary embodiment of a housing 800 for the BACnet gateway device 122. As seen in FIGS. 8A-8B, in some embodiments, the BACnet gateway device 122 includes two Ethernet ports with 10/100 megabytes per second (mbps) speed, one RS232 port, two USB 2.0 high-speed interfaces. In some embodiments, the BACnet gateway device 122 includes a central processing unit CPU model having an advanced reduced instruction set computer (RISC) machines (ARM) cortex-A7 CPU with 2 cores and ARM cortex-M4 with 1 cores, a CPU frequency of, for example, 1 gigahertz (GHz) (A7), 200 MHz (M4), and the like; a 32-bit architecture; a RAM size of 1 gigabyte (GB) (DDR3L), and a flash memory of 4 GB (embedded MultiMediaCard (eMMC) Not And (NAND) Flash). In some embodiments, with respect to communication interfaces, the BACnet gateway device 122 includes two ethernet ports one for web UI and BMS and another reserved for future implementation(s). In some embodiments, the BACnet gateway device 122 includes two USB 2.0 High-Speed interfaces, one B type interface and two RS232 interface.

Figure 9A:
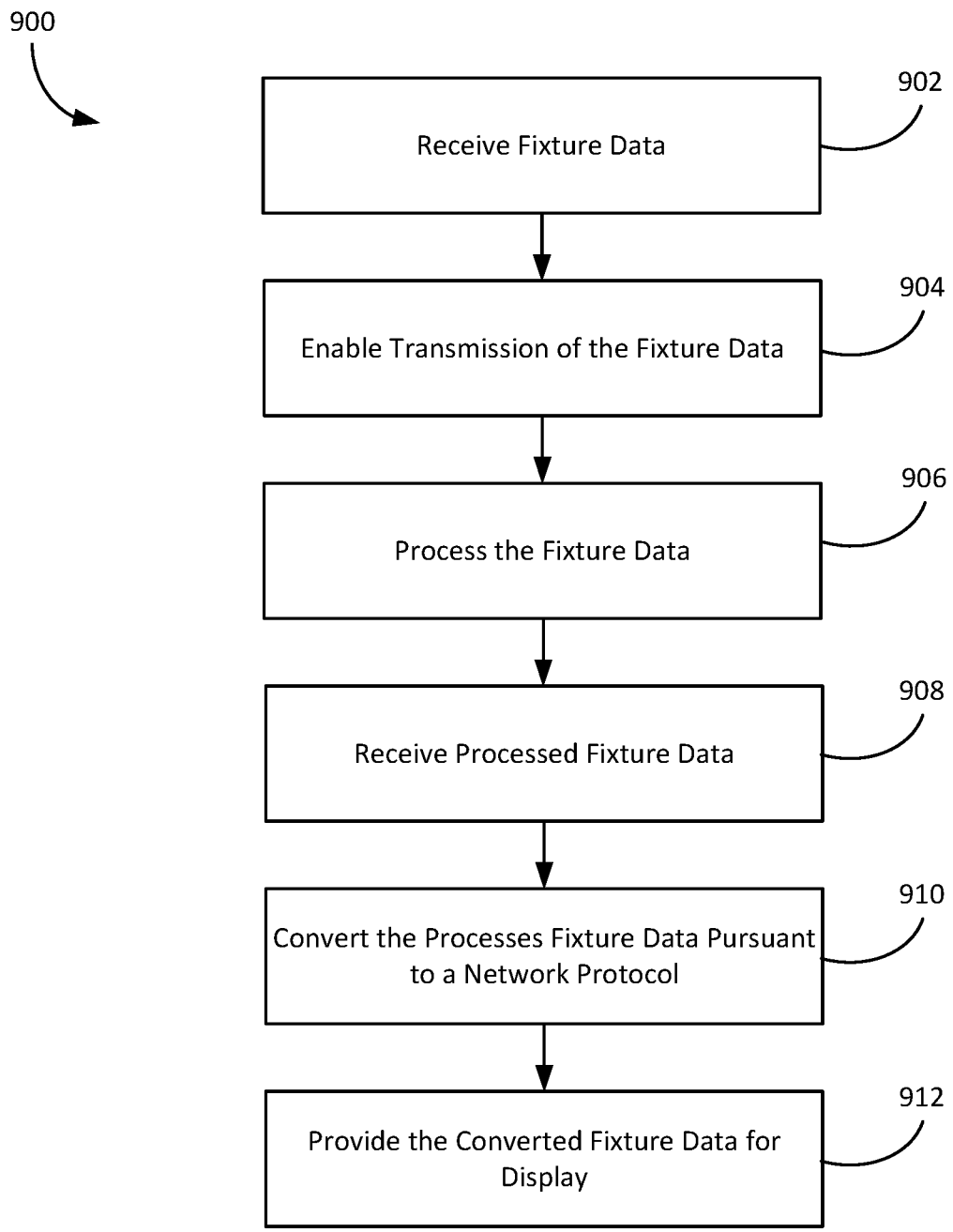
FIGS. 9A-9D depict flowcharts of non-limiting example processes that can be implementation by embodiments of the present disclosure.
Figure 9B:
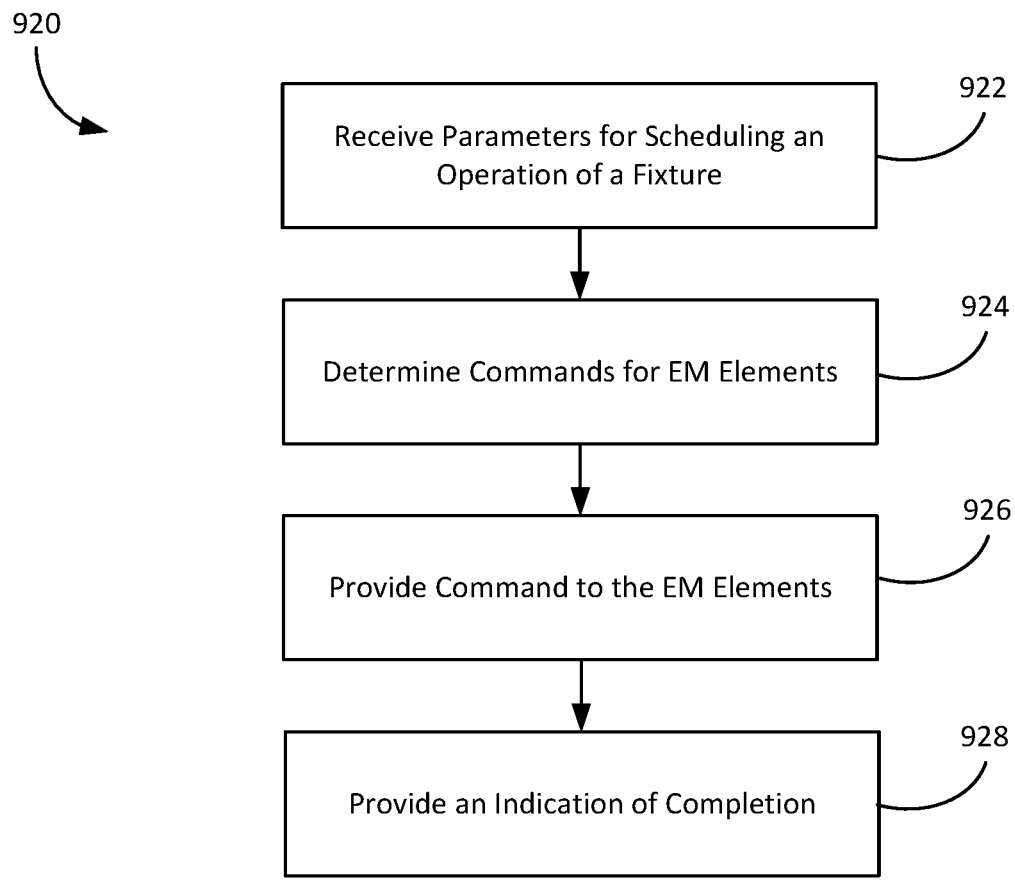
Figure 9C:
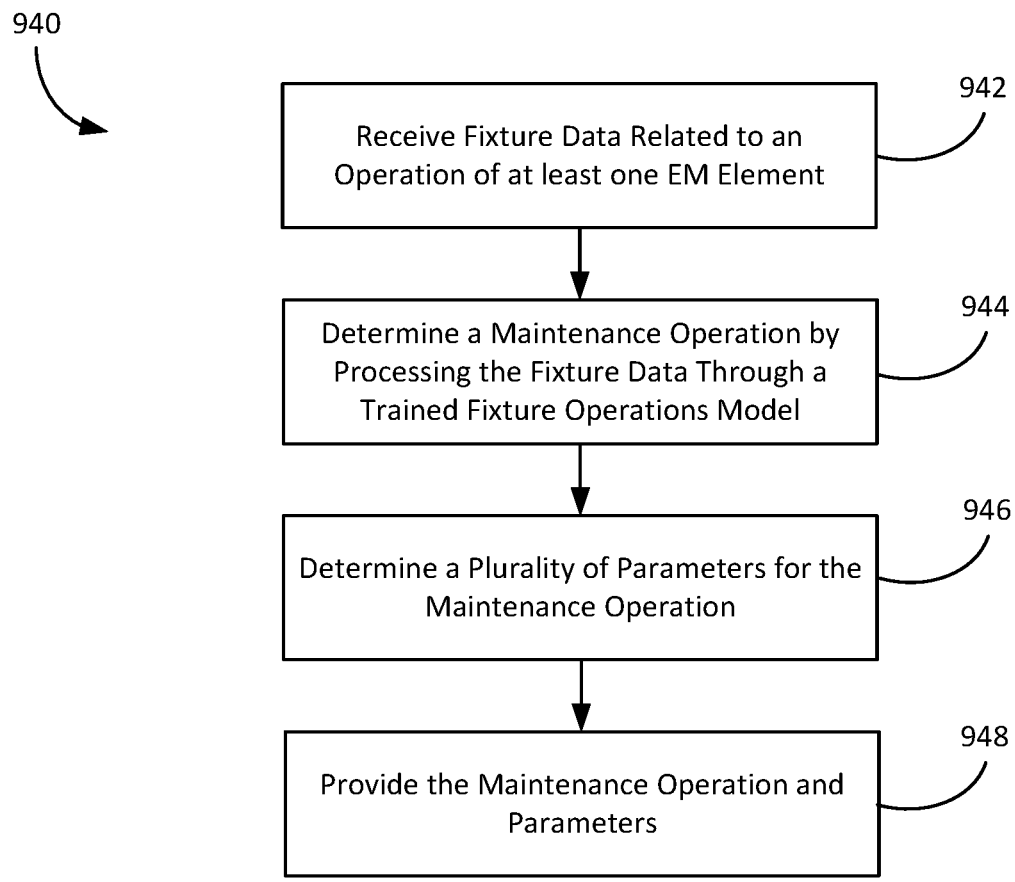

FIGS. 9A-9D depicts a flowchart of a non-limiting, exemplary that can be implementation by embodiments of the present disclosure. The flowchart depicted in FIG. 9A illustrates a process 900 for monitoring and managing a facility according. The flowchart depicted in FIG. 9B illustrates a process 920 for determining commands for EM elements, such as EM elements 125, based on received operation parameters. The flowchart depicted in FIG. 9C illustrates a process 940 for determining a maintenance operation for a fixture, such as fixture 107.

Figure 10:
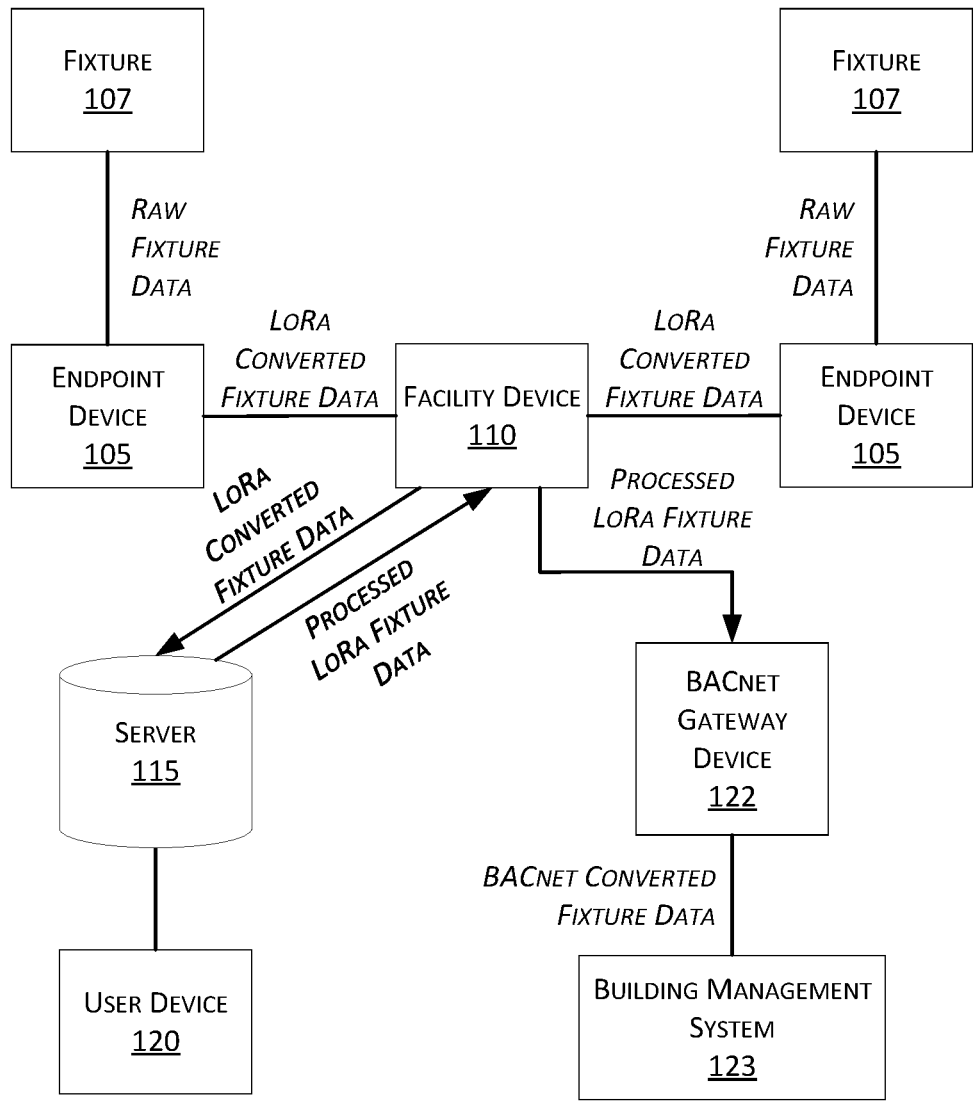
FIG. 10 depicts a non-limiting exemplary example of the communication between components of the system depicted in FIG. 1.

For clarity of presentation, the description that follows generally describes the processes 900, 920, and 940 in the context of FIGS. 1-8B and 10. For example, the process 900 is described with reference to FIG. 10. FIG. 10 depicts an exemplary embodiment of communication between the components of the system 100. However, it will be understood that the process the processes 900, 920, and 940 may be performed, for example, by any other suitable system or a combination of systems as appropriate.

Referencing FIG. 9A, at 902, fixture data is received from at least one EM element 125 of the fixture 107 associated with the facility. As noted above, in some embodiments, the EM elements 125 of the fixture 107 are configured to monitor or influence the operation of the fixture 107. Accordingly, in some embodiments, the fixture data for a particular fixture 107 is collected by the EM element(s) 125 where it is associated with that particular fixture 107. In some embodiments, the fixture data collected by the EM elements 125 of the fixture 107 is transmitted to the endpoint device 105 via a communication link between the fixture 107 and the endpoint device 105. In some embodiments, the fixture data is converted pursuant to a specific networking protocol consistent with a network connection between one or more components of the system 100. For example, in some embodiments, the endpoint device 105, the facility device 110, and the server 115 communicate via LoRa networking or communication protocols. Accordingly, in some embodiments, the electronic processor 200 of the endpoint device 105 converts the fixture data pursuant to LoRa networking protocols for transmission over a LoRa connection between the endpoint device 105 and the facility device 110. With reference to FIG. 10, in some embodiments, the fixture(s) 107 transmit "raw" fixture data to the endpoint device(s) 105. In response to receiving the raw fixture data, the endpoint device(s) 105 convert the "raw" fixture data pursuant to a specific networking protocol (in this example, a LoRa protocol). From 902, the process 900 proceeds to 904.

At 904, the fixture data is transmitted to a remote device for processing. For example, in some embodiments, the electronic processor 200 of the endpoint device 105 transmits the LoRa converted fixture data for processing over a network associated with the networking protocol. As described above, in some embodiments, the electronic processor 200 transmits the LoRa converted fixture data to the facility device 110 (as a gateway device). As illustrated in FIG. 10, in some embodiments, the endpoint device(s) 105 transmit the LoRa converted fixture data to the facility device 110. In some embodiments, the endpoint device 105 (e.g., the electronic processor 200) maintains a backlog of data packets (e.g., the LoRa converted data) until a connection to, for example, the facility device 110 is available (e.g., when a connection to the facility device 110 is temporarily unavailable). In some embodiments, the facility device 110 forwards the LoRa converted fixture data to a remote device, server, or database, for processing in the cloud, such as, for example, the server 115, the user device 120, or a combination thereof (as depicted in FIG. 10). In some embodiments, the server 115 (via an electronic processor of the server 115) receives fixture data (e.g., the LoRa converted fixture data) from the facility device 110. From 904, the process 900 proceeds to 906.

At 906, the received fixture data is processed to determine, for example, insights, usage patterns, alerts, and other data associated with the one or more facilities, including the fixtures 107 thereof. As an example, in some embodiments, a user employs the user device 120 (or another remote device) to access and interact with the fixture data. In some embodiments, the server 115 processes the received data to monitor a battery or power level (e.g., as a battery condition or characteristic) associated with the endpoint device 105. In some embodiments, the user views and interact with the determined usage patterns, which allow a facility entity or maintainer insights into, for example, how to optimize cleaning and maintenance schedules (e.g., for preventative or predicted maintenance), whether there is a need for additional facilities, endpoint devices, or a combination thereof, and the like. As noted above, in some embodiments, the server 115 is configured to monitor and manage one or more facilities, including the fixtures 107 therein. From 906, the process 900 proceeds to 908.

At 908, the processed fixture data is received by the facility device 110 (for example, the first gateway device) from server 115. As seen in FIG. 10, in some embodiments, after processing the LoRa converted fixture data, the server 115 may transmit the processed LoRa fixture data to the facility device 110. In some embodiments, in response to receiving the processed LoRa fixture data, the facility device 110 provides the processed LoRa fixture data to the BACnet gateway device 122. In some embodiments, the server 115 may transmit the processed LoRa fixture data directly to the BACnet gateway device 122 (not shown). From 908, the process 900 proceeds to 910.

At 910, in response to receiving the processed LoRa fixture data, the BACnet gateway device 122 converts the processed LoRa fixture data pursuant to a networking protocol associated with a building management solution or system (e.g., the BMS 123). As noted above, in some embodiments, the BMS 123, including the sub-systems included therein, communicates via BACnet communication protocol(s). As noted above, in some embodiments, the BMS 123 is associated with one or more particular vendors. As an example, in some embodiments, the BMS 123 includes a ventilation system associated with "Vendor A" and a security system associated with "Vendor B." In some embodiments, data associated with the BMS 123 is accessible to a user via a vendor specific dashboard (e.g., a BMS or visual dashboard), such as a browser application or dedicated software application designed by a particular vendor. Accordingly, in some embodiments, the BACnet gateway device 122 converts, via the BACnet electronic processor 400, the processed fixture data from a LoRa protocol to a BACnet protocol. From 910, the process 900 proceeds to 912.

At 912, after converting the processed LoRa fixture data, the BACnet gateway device 122 transmits the converted fixture data for display via a BMS or visual dashboard associated with the BMS 123. As noted above, in some embodiments, the converted fixture data includes one or more alerts, such as a water alert, a waste alert, a fire alert, an indoor air pollutant alert, a temperature alert, a contamination alert, and the like. Accordingly, in some embodiments, the BACnet gateway device 122 transmits the one or more alerts for display via the BMS or visual dashboard associated with the BMS 123. For example, as depicted in FIG. 10, in some embodiments, the BACnet gateway device 122 may transmit the converted fixture data (as BACnet converted fixture data) to the BMS 123 (or one or more components therein). From 912, the process 900 ends.

Referencing FIG. 9B, at 922, parameters for scheduling an operation of the fixture 107 are received from a service (e.g., BACnet services). In some embodiments, the fixture 107 is associated with a facility. In some embodiments, the operation of the fixture 107 is determined by processing the fixture data through a model trained with data received from the fixture and other fixtures associated with the facility. In some embodiments, the operation of the fixture 107 is determined based on an input from a user interface. In some embodiments, the operation of the fixture 107 is provided to a group of fixtures. In some embodiments, the fixture 107 is assigned to the group of fixtures. In some embodiments, the fixture is a thermal mixing valve, a fire protection device, a drain, a contamination monitor, an air quality monitor, a door handle, or a waste receptacle. In some embodiments, the service is provided by a BMS. In some embodiments, the parameters include a current time. In some embodiments, an internal RTC is synchronized based on the current time. From 922, the process 920 proceeds to 924.

At 924, commands for the EM element 125 and a respective time to execute each of the commands are determining based on the received parameters. From 924, the process 920 proceeds to 926.

At 926, each of the commands are provided to the respective EM element 125 for execution at the respective time of execution. In some embodiments, the EM element 125 is a water valve. In some embodiments, the operation of the fixture 107 includes a purge operation. In some embodiments, the parameters include a start time and a length of time for execution. In some embodiments, the commands include an on command for the water value and an off command for the water valve. In some embodiments, the on command is provide to the water value at the start time. In some embodiments, the off command is provided to the water valve the length of time for execution after the start time. In some embodiments, each of the commands is provided at the respective time based on the internal RTC. From 926, the process 920 proceeds to 928.

At 928, an indication of completion of the operation of the fixture is provided to the service via a communication interface (e.g., the BACnet communication interface 410). In some embodiments, fixture data determined according to an employment of the EM element is provided to the service via the communication interface. In some embodiments, an error condition is provided to the service via the communication interface when the EM element fails to execute the provided command. In some embodiments, a request for current operations is provided to the service via the communication interface when a connection to a network is reestablished. From 928, the process 920 ends.

Referencing FIG. 9C, at 942, fixture data related to an operation of at least one EM element 125 associated with the fixture 107 is received from the fixture 107. In some embodiments, the at least one EM element include an actuator or a sensor. In some embodiments, the EM element is a water valve. In some embodiments, the maintenance operation includes a purge operation. In some embodiments, the parameters include a start time and a length of execution. In some embodiments, the fixture 107 is a thermal mixing valve, a fire protection device, a drain, a contamination monitor, an air quality monitor, a door handle, or a waste receptacle. From 942, the process 940 proceeds to 944.

At 944, the fixture data is processed through a fixture maintenance model to determine a maintenance operation for the fixture, the fixture operations model trained with fixture data previously received from the fixture and other fixtures associated with the facility. From 944, the process 940 proceeds to 946.

At 926, a plurality of parameters is determined based on the maintenance operation and fixture data previously received from the fixture. From 946, the process 940 proceeds to 948.

At 948, the maintenance operation and associated parameters are provided to the fixture 107. In some embodiments, the maintenance operation and associated parameters are provided to a user-interface instead of the fixture 107. In some embodiments, a selection of maintenance operations for the fixture 107 is received from the user-interface. In some embodiments, the selection of maintenance operations and associated parameters are provided to the fixture 107. In some embodiments, the maintenance operation and associated parameters are provided to a group of fixtures associated with the fixture 107. In some embodiments, the maintenance operation and associated parameters are provided to an endpoint device 105 associated with the fixture 107 instead of directly to the fixture. From 948, the process 940 ends.

Figure 9D:
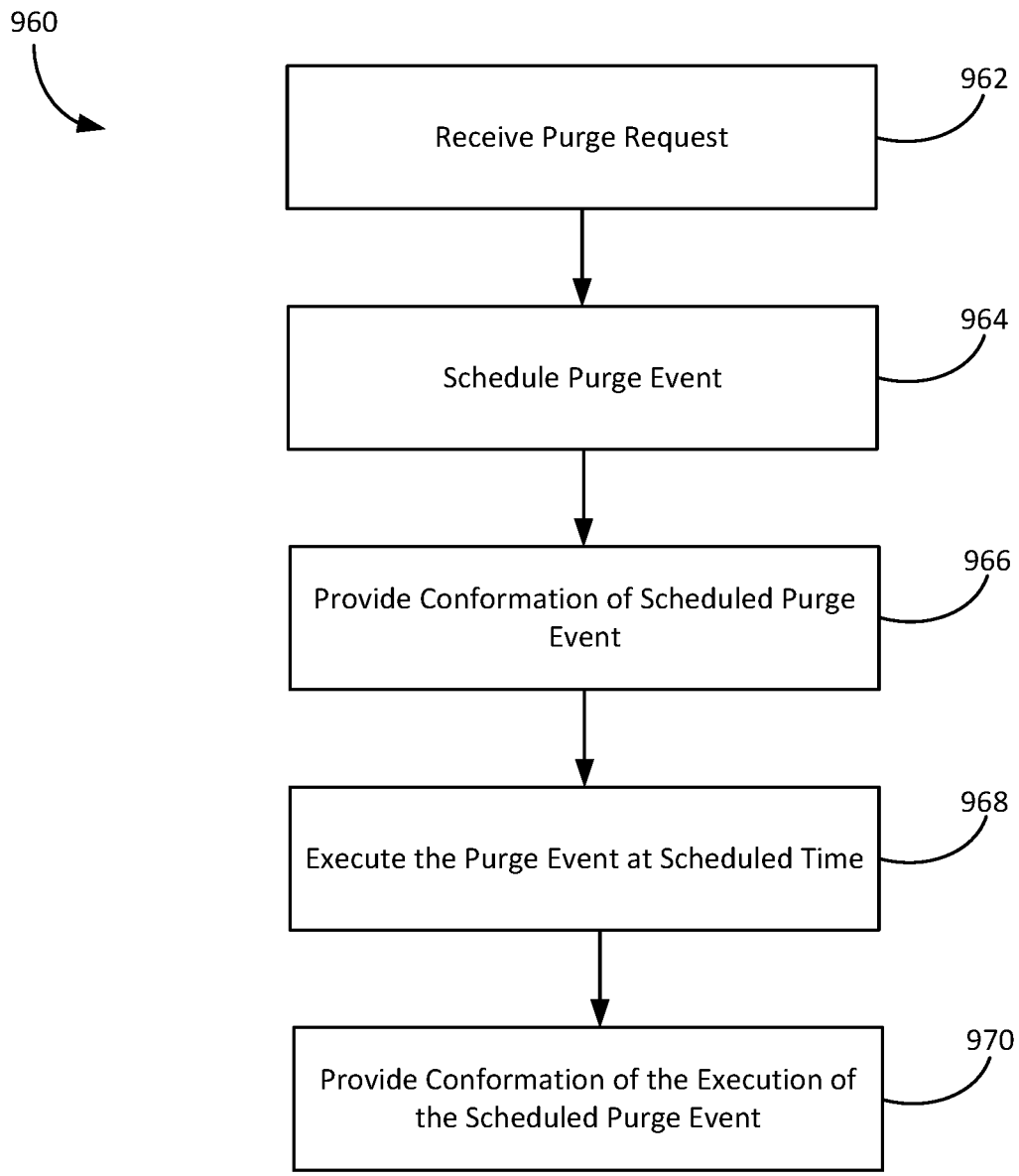

Referencing FIG. 9D, at 962, a purge request for a fixture 107 is received from a service (e.g., BACnet services). From 962, the process 960 proceeds to 964.

At 924, purge event is scheduled for the fixture 107 based on the received purge request. From 964, the process 960 proceeds to 966.

At 926, confirmation of the scheduling of the purge event is provided to the service. From 966, the process 960 proceeds to 968.

At 928, the purge event is executed by the fixture at the schedule time. From 968, the process 960 proceeds to 970

At 970, conformation of the execution of the purge event by the fixture 107 is provided to the service. From 970 the process 960 ends.

Examples

In some embodiments, the fixture 107 is a faucet. The server 115 analyzes the fixture data to, for example, monitor the communications between the EM elements 125 of a fixture 107 (e.g., a sensor and an actuator) to track, among other things, activations (e.g., "ON" and "OFF" signals); monitor temperature data from a temperature sensor (as an EM element 125 of the fixture 107) either positioned within the drain or the faucet itself to detect the flow of water by; determine when a run-on condition has occurred in response to determine that a predetermined period of time set by a user is exceeded and the faucet did not return to an "OFF" condition or water flow is still detected; or calculate water usage indirectly based on a duration of time that the valve of the faucet remains open and an estimated water flow rate.

In some embodiments, the fixture 107 is a flush valve. The server 115 analyzes the fixture data to, for example, monitor a magnitude of a voltage or current supplied to the EM element 125 (e.g., an actuator) of the fixture 107 to track when a flushing event is initiated; determine a length of time a person is detected using the fixture 107 on any given instance; or determine when an "ON" signal is provided (e.g., a person is detected) but no corresponding movement of the valve occurs. In some embodiments, the server 115 provides an error signal such that an alert is generated via, for example, the facility device 110, the user device 120, another component of the system 100, or a combination thereof. In some embodiments, such faults are determined by detecting an elevated voltage or current rate (e.g., a motor is bound).

In some embodiments, the fixture 107 is a resource dispenser. The server 115 analyzes the fixture data to, for example, monitor a magnitude of a voltage or current supplied to an EM element 125 (e.g., an actuator) of a fixture 107 to track when a resource dispensing event has occurred; monitor a level or amount of resource remaining in a reservoir of the fixture 107; or calculate an amount of resource remaining in a reservoir of the fixture 107 (e.g., by subtracting a predetermined volume or amount of resource discharged during a resource dispensing event for each detected activation). In some embodiments, when the server 115 determines that a level or amount of resource remaining in a reservoir of the fixture 107 has fallen below a predetermined amount or level, the server 115 provides an error signal such that an alert is generated via, for example, the facility device 110, the user device 120, another component of the system 100, or a combination thereof.

In some embodiments, the fixture 107 is a contamination monitor. The server 115 analyzes the fixture data to, for example, detect a presence of a contaminant and determine a contamination level of the contaminant. For example, in some embodiments, the server 115 analyzes the fixture data to detect the presence of *legionella*, and in response, determine a contamination level of *legionella* and compare the contamination level to a predetermined contamination threshold, which is set based on, for example, a type of contaminant. In some embodiments, server 115 compares a first type of contaminant to a first threshold and a second type of contaminant to a second threshold different than the first threshold. In some embodiments, the server 115 generates an alert or warning (e.g., a contamination alert) based on the comparison of the contamination level to the predetermined contamination threshold such that the alert may be generated via, for example, the facility device 110, the user device 120, the BMS 123, another component of the system 100, or a combination thereof. In some embodiments, when the server 115 determines that a contamination level exceeds a predetermined contamination threshold (such that the contamination level is at a dangerous level), the server 115 provides an alert signal such that an alert may be generated via the BMS 123 (such as a display device of the BMS 123).

In some embodiments, the fixture 107 is a thermal mixing valve. The server 115 analyzes the fixture data to, for example, monitor a water temperature (e.g., a water temperature associated with water flowing through a faucet, an input or control provided via a valve actuator (e.g., an EM element 125), or a combination thereof). In some embodiments, the server 115 analyzes the fixture data to detect a temperature associated with water flowing through a faucet such that the temperature is monitored in comparison to a temperature threshold or range. In some embodiments, the server 115 generates an alert or warning (e.g., a temperature alert) based on the comparison of the temperature to the temperature threshold or range. In some embodiments, when the temperature detected by the server 115 is outside of a temperature range (e.g., too hot or too cold) a warning or alert is issued. In some embodiments, when the temperature exceeds the temperature range or threshold, the warning or alert indicates a scalding condition where the water flowing through the faucet is too hot. In some embodiments, when the temperature is below the temperature range or threshold, the warning or alert indicates a cold-water condition where the water flowing through the faucet is too cold, which indicates a fault with a hot water heater or heating system of a building.

In some embodiments, the fixture 107 is an air quality monitor. The server 115 analyzes the fixture data to, for example, monitor an air condition associated with a facility. In some embodiments, the server 115 detects the presence of an indoor air pollutant, an indoor air pollutant level, or a combination thereof. In some embodiments, the server 115 detects the presence of carbon monoxide and, in response to detecting the presence of carbon monoxide, determine an amount of carbon monoxide (e.g., an indoor air pollutant level associated with the carbon monoxide). In some embodiments, the server 115 compares the indoor air pollutant level to a predetermined indoor air pollutant threshold or range. In some embodiments, based on the comparison, the server 115 generates an alert or warning (e.g., an indoor air pollutant alert). In some embodiments, the indoor air pollutant alert includes the presence of the indoor air pollutant, a facility with the indoor air pollutant (for example, a location of the facility), the indoor air pollutant level, a severity indication, and the like.

In some embodiments, the fixture 107 is a door handle. The server 115 analyzes the fixture data to, for example, monitor use of a door associated with the door handle to detect an occupancy of a family bathroom by monitoring the opening and closing of the door handle; detect an overall use of a specific bathroom stall based on how often the door handle associated with that specific bathroom stall is opened and closed within a predetermined period of time (e.g., a 24-hour period, a hour period, a week, and the like), and the like. In some embodiments, the door handle includes a consumable, refillable plastic paper, that includes microbial protection. In some embodiments, such plastic paper is released by cartridges that require refill on a regular basis. In some embodiments, the server 115 detects when a cartridge is almost empty and needs refilling and trigger an alert or warning.

In some embodiments, the fixture 107 is a fire protection device. The server 115 analyzes the fixture data to, for example, monitor an environment (e.g., a facility) for the presence of a fire condition (e.g., smoke) or determine an operational status of the fire protection device. In some embodiments, the server 115 generates an alert or warning (e.g., a fire alert) in response to detecting the presence of a fire condition. In some embodiments, when the server 115 detects the presence of smoke in a facility, the server 115 generates a fire alert associated with the facility. In some embodiments, such a fire alert includes the presence of the fire condition, an indication of what the fire condition is, a facility with the fire condition (e.g., a location of the facility), a severity of the fire condition, an automated action triggered in response to detecting the fire condition (e.g., activation of a sprinkler system), a duration of the automated action, a duration of the fire condition, a current status of the fire condition (e.g., whether the fire condition is increasing or decreasing), and the like. In some embodiments, the server 115 generates an alert or warning (e.g., a maintenance alert) based on an operational status of the fire protection device. In some embodiments, when the server 115 determines that the operational status for the fire protection device is not operational, the server 115 generates a maintenance alert indicating that the fire protection device is not operational.

In some embodiments, the fixture 107 is a waste receptacle. The server 115 analyzes the fixture data to, for example, monitor the level or amount of waste in the waste receptacle or monitors usage of the waste receptacle (e.g., how many times the waste receptacle is used). In some embodiments, the server 115 detects a current level or amount of waste in the container or receptacle. In some embodiments, the server 115 determines the number of times a lid of the waste receptacle is opened (or triggered to open via, for example, a foot-pedal). In some embodiments, the server 115 determines (e.g., via motion sensing) the number of times that waste is deposited into the waste receptacle. In some embodiments, the server 115 compares the amount of waste in the waste receptacle, the detected usage of the waste receptacle, or a combination thereof to a waste threshold. In some embodiments, the server 115 generates an alert or warning (e.g., a waste alert) based on the comparison. In some embodiments, where the waste threshold represents a maximum amount of waste for the waste receptacle, the server 115 generates a waste alert that indicates a need to empty the waste receptacle. In some embodiments, where the waste threshold represents a maximum usage amount for the waste receptacle, the server 115 generates a waste alert that indicates a need to empty the waste receptacle.

In some embodiments, the fixture 107 is a drain. The server 115 analyzes the fixture data to, for example, monitor an amount of water flowing through the drain. In some embodiments, the drain is a sink drain. The server 115 analyzes the fixture data to, for example, monitor an amount of water flowing through the sink drain such that a usage of a sink associated with the sink drain may be monitored, a run-on condition of a faucet associated with the sink drain may be detected, and the like. In some embodiments, the drain is a floor drain. The server 115 analyzes the fixture data to, for example, monitor an amount of water flowing through the floor drain such that a usage of a shower stall associated with the floor drain may be monitored, an over-flow condition or leak condition of another fixture (such as a facet, a toilet, or the like) may be detected, and the like. In some embodiments, the drain is a roof drain. The server 115 analyzes the fixture data to, determine maintenance needs, predict remaining life cycle of the roof drain, monitor a flow rate of water in comparison to other roof drains, and the like In some embodiments, the server 115 compares the fixture data to one or more water thresholds or ranges and generates an alert or warning (e.g., a water alert) based on the comparison. In some embodiments, the water alert indicates a need to service or perform maintenance on a roof drain, a run-on condition, an over-flow condition or leak condition, an obstructed condition, and the like.

In some embodiments, the server 115 analyzes the fixture data to monitor the battery life (e.g., an energy level or energy usage) using various indicators, such as a graphical representation of a fuel gauge. In some embodiments, the server 115 generates alerts and warnings in response to detecting a predetermined energy level. In some embodiments, the predetermined energy level indicates an end of battery life scenario, an energy source replacement scenario, and the like. In some embodiments, the server 115 provides a low energy level alert to a user of the user device 120 (via, for example, a display device of the user device 120) when a predetermined energy level indicating a low energy level s detected.

Although not illustrated, in some embodiments the BMS 123 includes one or more computing devices, servers, databases, or other devices. In some embodiments, the BMS 123 includes a computing device (similar to the user device 120). In some embodiments, the computing device (or another component of the BMS 123) integrates the BACnet converted fixture data with additional data from one or more building sub-systems included in the BMS 123. As an example, in some embodiments, the computing device (or another component of the BMS 123) integrates the BACnet converted fixture data and the additional data as building data, such that the building data may be displayed to a user via, for example, a BMS or visual dashboard, such that a user may access and interact with the building data. Accordingly, in some embodiments, the computing device (or another component of the BMS 123) receives a user interaction with the BMS or visual dashboard. In some embodiments, the user interaction is associated with the building data (or a portion thereof). In some embodiments, based on the received user interaction, the computing device (or another component of the BMS 123) controls one or more sub-systems included in the BMS 123 or the fixtures 107. As an example, in some embodiments, the computing device (or another component of the BMS 123) provides a control signal for controlling a building sub-system, one or more fixtures 107, or a combination thereof, based on the user interaction.

In some embodiments, the converted fixture data includes a contamination alert indicating the presence of contamination at a particular contamination level. In some embodiments, the BMS 123 provides the contamination alert to a user of the BMS 123 via a display device of the BMS 123 (e.g., the visual dashboard of the BMS 123). In response to the contamination alert, the user may interact with the visual dashboard of the BMS 123 to initiate an action addressing the contamination alert. As an example, the user may turn off a water service line associated with the contamination.

In some embodiments, the converted fixture data includes an indoor air pollutant alert indicating the presence of an indoor air pollutant alert in a facility. In some embodiments, the BMS 123 provides the indoor air pollutant alert to a user of the BMS 123 via a display device of the BMS 123 (e.g., the visual dashboard of the BMS 123). In response to the indoor air pollutant alert, the user may interact with the visual dashboard of the BMS 123 to initiate an action addressing the indoor air pollutant alert. As an example, where the indoor air pollutant alert indicates a high severity level, the user may "close" the facility with the presence of the indoor air pollutant, such as by remotely locking a door to the facility, triggering a visual status indicator for the facility (e.g., a light up closed sign), and the like. As another example, where the indoor air pollutant alert indicated a low severity level, the user may schedule an indoor air pollutant evaluation or test by a testing entity.

Non-Transitory Computer Readable Storage Medium

In some embodiments, the platforms, systems, media, and methods disclosed herein include one or more non-transitory computer readable storage media encoded with a program including instructions executable by the operating system of an optionally networked computer. In further embodiments, a computer readable storage medium is a tangible component of a computer. In still further embodiments, a computer readable storage medium is optionally removable from a computer. In some embodiments, a computer readable storage medium includes, by way of non-limiting examples, CD-ROMs, DVDs, flash memory devices, solid state memory, magnetic disk drives, magnetic tape drives, optical disk drives, cloud computing systems and services, and the like. In some cases, the program and instructions are permanently, substantially permanently, semi-permanently, or non-transitorily encoded on the media.

Computer Program

In some embodiments, the platforms, systems, media, and methods disclosed herein include at least one computer program, or use of the same. A computer program includes a sequence of instructions, executable in the computer's CPU, written to perform a specified task. Computer readable instructions may be implemented as program modules, such as functions, objects, API, data structures, and the like, that perform particular tasks or implement particular abstract data types. In light of the disclosure provided herein, those of skill in the art will recognize that a computer program may be written in various versions of various languages.

The functionality of the computer readable instructions may be combined or distributed as desired in various environments. In some embodiments, a computer program comprises one sequence of instructions. In some embodiments, a computer program comprises a plurality of sequences of instructions. In some embodiments, a computer program is provided from one location. In other embodiments, a computer program is provided from a plurality of locations. In various embodiments, a computer program includes one or more software modules. In various embodiments, a computer program includes, in part or in whole, one or more web applications, one or more mobile applications, one or more standalone applications, one or more web browser plug-ins, extensions, add-ins, or add-ons, or combinations thereof.

Machine Learning

In some embodiments, machine learning algorithms are employed to build a model to determine quantifiable measures of dyadic ties between the individuals. In some embodiments, machine learning algorithms are employed to build a model to determine the filter relevant or chorological contact information for a user. Examples of machine learning algorithms may include a support vector machine (SVM), a naïve Bayes classification, a random forest, a neural network, deep learning, or other supervised learning algorithm or unsupervised learning algorithm for classification and regression. The machine learning algorithms may be trained using one or more training datasets. For example, previously received contextual data may be employed to train various algorithms. Moreover, as described above, these algorithms can be continuously trained/retrained using real-time user data as it is received. In some embodiments, the machine learning algorithm employs regression modelling where relationships between variables are determined and weighted. In some embodiments, the machine learning algorithm employ regression modelling, wherein relationships between predictor variables and dependent variables are determined and weighted.

Software Modules

In some embodiments, the platforms, systems, media, and methods disclosed herein include software, server, and/or database modules, or use of the same. In view of the disclosure provided herein, software modules are created by techniques known to those of skill in the art using machines, software, and languages known to the art. The software modules disclosed herein are implemented in a multitude of ways. In various embodiments, a software module comprises a file, a section of code, a programming object, a programming structure, or combinations thereof. In further various embodiments, a software module comprises a plurality of files, a plurality of sections of code, a plurality of programming objects, a plurality of programming structures, or combinations thereof. In various embodiments, the one or more software modules comprise, by way of non-limiting examples, a web application, a mobile application, and a standalone application. In some embodiments, software modules are in one computer program or application. In other embodiments, software modules are in more than one computer program or application. In some embodiments, software modules are hosted on one machine. In other embodiments, software modules are hosted on more than one machine. In further embodiments, software modules are hosted on cloud computing platforms. In some embodiments, software modules are hosted on one or more machines in one location. In other embodiments, software modules are hosted on one or more machines in more than one location.

Web Application

In some embodiments, a computer program includes a web application. In light of the disclosure provided herein, those of skill in the art will recognize that a web application, in various embodiments, utilizes one or more software frameworks and one or more database systems. In some embodiments, a web application is created upon a software framework such as Microsoft® .NET or Ruby on Rails (RoR). In some embodiments, a web application utilizes one or more database systems including, by way of non-limiting examples, relational, non-relational, object oriented, associative, and eXtensible Markup Language (XML) database systems. In further embodiments, suitable relational database systems include, by way of non-limiting examples, Microsoft® SQL Server, mySQL™, and Oracle®. Those of skill in the art will also recognize that a web application, in various embodiments, is written in one or more versions of one or more languages. A web application may be written in one or more markup languages, presentation definition languages, client-side scripting languages, server-side coding languages, database query languages, or combinations thereof. In some embodiments, a web application is written to some extent in a markup language such as Hypertext Markup Language (HTML), Extensible Hypertext Markup Language (XHTML), or XML. In some embodiments, a web application is written to some extent in a presentation definition language such as Cascading Style Sheets (CSS). In some embodiments, a web application is written to some extent in a client-side scripting language such as Asynchronous JavaScript and XML (AJAX), Flash® ActionScript, JavaScript, or Silverlight®. In some embodiments, a web application is written to some extent in a server-side coding language such as Active Server Pages (ASP), ColdFusion®, Perl, Java™, JavaServer Pages (JSP), Hypertext Preprocessor (PHP), Python™, Ruby, Tcl, Smalltalk, WebDNA®, or Groovy. In some embodiments, a web application is written to some extent in a database query language such as Structured Query Language (SQL). In some embodiments, a web application integrates enterprise server products such as IBM® Lotus Domino®. In some embodiments, a web application includes a media player element. In various further embodiments, a media player element utilizes one or more of many suitable multimedia technologies including, by way of non-limiting examples, Adobe® Flash®, HTML 5, Apple® QuickTime®, Microsoft® Silverlight®, Java™, and Unity®.

Mobile Application

In some embodiments, a computer program includes a mobile application provided to a mobile computer. In some embodiments, the mobile application is provided to a mobile computer at the time it is manufactured. In other embodiments, the mobile application is provided to a mobile computer via the computer network described herein.

In view of the disclosure provided herein, a mobile application is created by techniques known to those of skill in the art using hardware, languages, and development environments known to the art. Those of skill in the art will recognize that mobile applications are written in several languages. Suitable programming languages include, by way of non-limiting examples, C, C++, C #, Objective-C, Java™, JavaScript, Pascal, Object Pascal, Python™, Ruby, VB.NET, WML, and XHTML/HTML with or without CSS, or combinations thereof.

Suitable mobile application development environments are available from several sources. Commercially available development environments include, by way of non-limiting examples, AirplaySDK, alcheMo, Appcelerator®, Celsius, Bedrock, Flash Lite, .NET Compact Framework, Rhomobile, and WorkLight Mobile Platform. Other development environments are available without cost including, by way of non-limiting examples, Lazarus, MobiFlex, MoSync, and Phonegap. Also, mobile device manufacturers distribute software developer kits including, by way of non-limiting examples, iPhone and iPad (iOS) SDK, Android™ SDK, BlackBerry® SDK, BREW SDK, Palm® OS SDK, Symbian SDK, webOS SDK, and Windows® Mobile SDK.

Those of skill in the art will recognize that several commercial forums are available for distribution of mobile applications including, by way of non-limiting examples, Apple® App Store, Google® Play, Chrome WebStore, BlackBerry® App World, App Store for Palm devices, App Catalog for webOS, Windows® Marketplace for Mobile, Ovi Store for Nokia® devices, Samsung® Apps, and Nintendo® DSi Shop.

Standalone Application

In some embodiments, a computer program includes a standalone application, which is a program that is run as an independent computer process, not an add-on to an existing process, e.g., not a plug-in. Those of skill in the art will recognize that standalone applications are often compiled. A compiler is a computer program(s) that transforms source code written in a programming language into binary object code such as assembly language or machine code. Suitable compiled programming languages include, by way of non-limiting examples, C, C++, Objective-C, COBOL, Delphi, Eiffel, Java™, Lisp, Python™, Visual Basic, and VB .NET, or combinations thereof. Compilation is often performed, at least in part, to create an executable program. In some embodiments, a computer program includes one or more executable complied applications.

Data Stores

In some embodiments, the platforms, systems, media, and methods disclosed herein include one or more data stores. In view of the disclosure provided herein, those of skill in the art will recognize that data stores are repositories for persistently storing and managing collections of data. Types of data stores repositories include, for example, databases and simpler store types, or use of the same. Simpler store types include files, emails, and the like. In some embodiments, a database is a series of bytes that is managed by a DBMS. Many databases are suitable for receiving various types of data, such as weather, maritime, environmental, civil, governmental, or military data. In various embodiments, suitable databases include, by way of non-limiting examples, relational databases, non-relational databases, object-oriented databases, object databases, entity-relationship model databases, associative databases, and XML databases. Further non-limiting examples include SQL, PostgreSQL, MySQL, Oracle, DB2, and Sybase. In some embodiments, a database is internet-based. In some embodiments, a database is web-based. In some embodiments, a database is cloud computing based. In some embodiments, a database is based on one or more local computer storage devices.

While preferred embodiments of the present disclosure have been shown and described herein, it will be obvious to those skilled in the art that such embodiments are provided by way of example only. Numerous variations, changes, and substitutions will now occur to those skilled in the art without departing from the described system. It should be understood that various alternatives to the embodiments described herein may be employed in practicing the described system.

Particular implementations of the subject matter have been described. Other implementations, alterations, and permutations of the described implementations are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations may be considered optional), to achieve desirable results.

Moreover, the separation or integration of various system modules and components in the implementations described earlier should not be understood as requiring such separation or integration in all implementations, and it should be understood that the described components and systems can generally be integrated together in a single product or packaged into multiple products. Accordingly, the earlier description of example embodiments does not define or constrain this disclosure. Other changes, substitutions, and alterations are also possible without departing from the spirit and scope of this disclosure.

Thus, the invention provides, among other things, a system for determining operation for a fixture. Various features and advantages of the invention are set forth in the following claims.

What is claimed is:

1. A fixture operation system comprising:
   a fixture;
   a first electro-mechanical element associated with the fixture;
   a second electro-mechanical element associated with the fixture, wherein the second electro-mechanical element is communicatively coupled to the first electro-mechanical element;
   a communication interface;
   a processor; and
   a computer-readable storage media coupled to the processor and having instructions stored thereon which, when executed by the processor, causes the processor to perform operations comprising:
      providing, via the communication interface, fixture data determined according to an employment of the first and second electro-mechanical elements,
      receiving, via the communication interface, parameters relating to a scheduled automatic operation of the fixture including an execution time;
      determining, based on the parameters, at least one command relating to the scheduled fixture operation;
      providing the at least one command to the first electro-mechanical element or the second electro-mechanical element for execution at the execution time; and
      providing, via the communication interface, an indication of completion of the scheduled automatic operation.

2. The fixture operation system of claim 1, wherein the fixture is associated with a facility.

3. The fixture operation system of claim 1, wherein parameters for controlling an operation of the fixture are determined based on an input from a user interface.

4. The fixture operation system of claim 3, wherein the user interface is a facility device.

5. The fixture operation system of claim 1 further comprising an endpoint device, wherein the endpoint device comprises the communication interface, the processor, the computer-readable storage media, and an energy source.

6. The fixture operation system of claim 1, wherein the first electro-mechanical element is a sensor, and wherein the second electro-mechanical element is an actuator.

7. The fixture operation system of claim 6, wherein the first electro-mechanical element is one of a flow sensor, a position sensor, a proximity sensor, and a thermocouple, and wherein the second electro-mechanical element is one of a valve, an actuator, and a valve actuating solenoid.

8. The fixture operation system of claim 1, wherein the fixture is a faucet, a flushometer, a flush valve, a soap dispenser, a handwashing system, a water service line monitor, a backflow preventer, a floor drain, a hand dryer, a pressure sensor, a water use sensor, a flow sensor, a valve sensor, a lavatory, a toilet, a urinal, a water closet, a bottle and glass filler, a drain, a drinking water fountain, an air quality monitor, an air or room quality sensor, a backflow preventer, a leak detection sensor, an occupancy detection sensor, a resource dispenser, a fire protection device or fixture, a waste receptacle, a door handle, a thermal mixing valve, or a contamination monitor.

9. The fixture operation system of claim 1, wherein, when the first electro-mechanical element is triggered, the first electro-mechanical element is configured to trigger the second electro-mechanical element.

10. A fixture operation system comprising:
at least one fixture associated with a facility, the fixture comprising an electro-mechanical element;
a facility device associated with the facility; and
an endpoint device associated with the at least one fixture and communicatively connected with the fixture and the facility device, the endpoint device comprising:
a processor; and
a computer-readable storage device coupled to the processor and having instructions stored thereon which, when executed by the processor, causes the processor to perform operations comprising:
receiving, from the facility device, data representing at least one operating parameter, including an execution time, for performing a scheduled automatic operation;
determining, based on the data, at least one command;
providing the at least one command and the execution time to the electro-mechanical element, wherein the electro-mechanical element is configured to:
execute the at least one command at the execution time; and
receiving an indication of completion of the scheduled automatic operation of the fixture.

11. The fixture operation system of claim 10, wherein the at least one operating parameter is a one of a duration of time for an operation, a predetermined volume, and a current time to synchronize an internal clock.

12. The fixture operation system of claim 10, wherein the electro-mechanical element is an actuator or a sensor.

13. The fixture operation system of claim 10, wherein the operations performed by the processor comprises determining, based on the data, a plurality of commands, and wherein the electro-mechanical element is configured to execute the plurality of commands at the execution time.

14. The fixture operation system of claim 10, wherein the operations further comprise:
sending, via the endpoint device, the indication of completion of the operation of the fixture to a server.

15. The fixture operation system of claim 10, wherein the operations further comprise:
providing, via the endpoint device, an error condition when the electro-mechanical element fails to execute the provided commands.

16. The fixture operation system of claim 10, wherein the operating parameters comprise a current time, and wherein the operations further comprise:
synchronizing an internal real-time clock (RTC) based on the current time.

17. A method for remotely scheduling and executing a fixture operation comprising:
sending, from a facility device associated with a facility, data representing a scheduled automatic operation including at least one operating parameter and an execution time, to an end point device associated with a fixture in the facility;
receiving, via the endpoint device associated with the fixture, data representing the scheduled automatic operation; and
sending, from the endpoint device to a server, an indication of completion of the scheduled automatic operation of the fixture; and
wherein the endpoint device is configured to determine, based on the operation and the operating parameters, a plurality of commands; and
provide the plurality of commands to a fixture for execution at the execution time.

18. The method for remotely scheduling and executing a fixture operation of claim 17, wherein the electro-mechanical element is a water valve, and wherein the operation is a purge operation.

19. The method for remotely scheduling and executing a fixture operation of claim 17, wherein the at least one operating parameter is one of a duration of time for an operation, a predetermined volume, and a current time to synchronize an internal clock.

20. The method for remotely scheduling and executing a fixture operation of claim 17 further comprising sending, from the end point device to the server, confirmation of a scheduled operation.

\* \* \* \* \*